US008872890B2

(12) United States Patent
Tsukagoshi

(10) Patent No.: US 8,872,890 B2
(45) Date of Patent: Oct. 28, 2014

(54) METHOD AND RECEIVER FOR ENABLING SWITCHING INVOLVING A 3D VIDEO SIGNAL

(75) Inventor: Ikuo Tsukagoshi, Tokyo (JP)

(73) Assignee: Sony Corporation (JP)

( * ) Notice: Subject to any disclaimer, the term of this patent is extended or adjusted under 35 U.S.C. 154(b) by 435 days.

(21) Appl. No.: 13/142,336

(22) PCT Filed: Oct. 28, 2010

(86) PCT No.: PCT/JP2010/069154
§ 371 (c)(1),
(2), (4) Date: Aug. 19, 2011

(87) PCT Pub. No.: WO2011/055674
PCT Pub. Date: May 12, 2011

(65) Prior Publication Data
US 2012/0026287 A1 Feb. 2, 2012

(30) Foreign Application Priority Data

Nov. 5, 2009 (JP) .................................. 2009-254471
Feb. 3, 2010 (JP) .................................. 2010-022240

(51) Int. Cl.
*H04N 13/00* (2006.01)
*H04N 13/04* (2006.01)

(52) U.S. Cl.
CPC ........ *H04N 13/0029* (2013.01); *H04N 13/0059* (2013.01); *H04N 13/0055* (2013.01); *H04N 13/004* (2013.01); *H04N 13/0452* (2013.01); *H04N 13/0066* (2013.01)
USPC .................................. 348/42; 348/43; 348/51

(58) Field of Classification Search
CPC ....................... H04N 13/0239; H04N 13/0497
USPC .......................................................... 348/43
See application file for complete search history.

(56) References Cited

U.S. PATENT DOCUMENTS

| 6,108,047 | A | * | 8/2000 | Chen | 348/581 |
| 8,306,387 | B2 | * | 11/2012 | Yamashita et al. | 386/239 |
| 2006/0269226 | A1 | * | 11/2006 | Ito et al. | 386/95 |
| 2006/0279750 | A1 | * | 12/2006 | Ha | 358/1.2 |

(Continued)

FOREIGN PATENT DOCUMENTS

| CN | 1882080 A | 12/2006 |
| CN | 201215988 Y | 4/2009 |

(Continued)

OTHER PUBLICATIONS

Office Action from China Application No. 201080006739.3, dated Jul. 15, 2013.

(Continued)

*Primary Examiner* — Jessica M Prince
(74) *Attorney, Agent, or Firm* — Lerner, David, Littenberg, Krumholz & Mentlik, LLP

(57) ABSTRACT

A transmitter according to the present invention includes a decoder that decodes a video signal received from outside and acquires identification information including a format concerning 2D or 3D of video from a layer corresponding to each frame of the video signal and a backend processor that performs spatial or temporal scaling of video data by the video data based on the identification information and, when the format of the video is switched, switches parameters for the scaling adjusting to switching timing.

12 Claims, 20 Drawing Sheets

(56) References Cited

U.S. PATENT DOCUMENTS

| | | | |
|---|---|---|---|
| 2007/0046818 A1* | 3/2007 | Uchino | 348/556 |
| 2009/0092335 A1* | 4/2009 | Kim et al. | 382/285 |
| 2009/0096864 A1 | 4/2009 | Hwang et al. | |
| 2009/0128622 A1* | 5/2009 | Uchiumi et al. | 348/51 |
| 2010/0026783 A1* | 2/2010 | Chiu et al. | 348/43 |

FOREIGN PATENT DOCUMENTS

| | | |
|---|---|---|
| JP | 09-138384 A | 5/1997 |
| JP | 11-073376 A | 3/1999 |
| JP | 2000-036969 A | 2/2000 |
| JP | 2003-045343 A | 2/2003 |
| JP | 2005-094168 A | 4/2005 |
| JP | 2006-140618 A | 6/2006 |
| JP | 2009182953 A | 8/2009 |

OTHER PUBLICATIONS

Office Action from Japanese Application No. 2010-022240, dated Sep. 24, 2013.

* cited by examiner

Receiver Block Diagram

FIG.3

| Codec Elementary Layer | Syntax & Semantics | Example Syntax |
|---|---|---|

```
3D_Format_Signaling_Info(){
    3D Format Signaling_ID              8bits
    3D_Type_Reset_flag                  1bit
    Prohibit_Convert_flag               1bit
    Reserved                            6bits
    Frame_Countdown_to_reset            8bits
    3D_Type                             6bits
    View_copy                           1bit L_First_flag                        1bit
    Next_3D_type_after_reset            6bits
    Reference_Dependency                2bits
}
```

FIG.4

3D_Format_Signaling_Info  Example Semantics  (1)

| | |
|---|---|
| 3D Format Signaling_ID | 8bits |
| 3D_Type_Reset_flag | 1bit |
| | "1" denotes the current 3D Type is reset immediately at the current Frame. |
| | "0" denotes the current 3D Type is continued. |
| Frame_Countdown | 8bits |
| | Indicate the time offset in frame by reducing the value from 0xFE to 0x00, when 0x00, 3D_Type_Reset_flag should be set. |
| | If the frame countdown is not in use, the value must be 0xFF. |
| 3D Type | 5bits |
| View_Copy | 1bit |
| | All other values are expected to be thrown out. |
| | "1" denotes the 2nd View is the copy of 1st View. |
| | "0" denotes the 1st View and 2nd View are independent. |
| Reserved | 1bit |

FIG.5

| 3D Type | 6bits |
|---|---|
| 000000 | Non-3D format |
| 100000 | Frame Sequential 1st View in Frame-pair |
| 100001 | Frame Sequential 2nd View in Frame-pair |
| 110000 | Frame based Field Sequential, Top Field is 1st View 1st field, Bottom Field is 2nd View 1st field in field-pair. |
| 110001 | Frame based Field Sequential, Top Field is 1st View 2nd field, Bottom Field is 2nd View 2nd field in field-pair. |
| 110010 | Frame based Field Sequential, Top Field is 1st View 2nd field, Bottom Field is 2nd View 1st field in field-pair. |
| 110011 | Frame based Field Sequential, Top Field is 1st View 2nd field, Bottom Field is 2nd View 1st field in field-pair. |
| 010000 | Field Sequential 1st View 1st field in 3D field-pair |
| 010001 | Field Sequential 2nd View 1st field in 3D field-pair |
| 010010 | Field Sequential 1st View 2nd field in 3D field-pair |
| 010011 | Field Sequential 2nd View 2nd field in 3D field-pair |

FIG.6

| 3D Type | | 6bits | |
|---|---|---|---|
| 001000 | SideBySide | Horizontally divided by two halves. LeftSide is 1st view, RightSide is 2nd view with the same horizontal sampling position, even pixels, across the views |
| 001001 | SideBySide | Horizontally divided by two halves. LeftSide is 1st view, RightSide is 2nd view with the same horizontal sampling position, odd pixels, across the views |
| 001010 | SideBySide | Horizontally divided by two halves. LeftSide is 1st view, RightSide is 2nd view with the alternative horizontal sampling position, 1stView even pixels, 2ndView odd pixels. |
| 001011 | SideBySide | Horizontally divided by two halves. LeftSide is 1st view, RightSide is 2nd view with the alternative horizontal sampling position, 1stView odd pixels, 2ndView even pixels. |
| 000100 | Top&Bottom | Vertically divided by two halves. UpperSide is 1st view, LowerSide is 2nd view with the same vertical sampling position, 1st View even lines, 2nd View even lines. |
| 000101 | Top&Bottom | Vertically divided by two halves. UpperSide is 1st view, LowerSide is 2nd view with the alternative vertical sampling position, 1st View even lines, 2nd View odd lines. |
| 000110 | Top&Bottom | Vertically divided by two halves. UpperSide is 1st view, LowerSide is 2nd view with the same vertical sampling position, 1st View odd lines, 2nd View even lines. |
| 000111 | Top&Bottom | Vertically divided by two halves. UpperSide is 1st view, LowerSide is 2nd view with the alternative vertical sampling position, 1st View odd lines, 2nd View odd lines. |

FIG.7

| 3D_Format_Signaling_Info | | Example Semantics (1) |
|---|---|---|
| L_First_flag | 1bit | "1" denotes the first view in combination is L. |
| | | "0" denotes the first view in combination is R. |
| Next_3D_type_after_reset | 5bits | The same as 3D Type. |
| Reference_Dependency | 2bits | "10" denotes 1st view refers to 1st view only. |
| | | "01" denotes 2ndt view refers to 2nd view only. |
| | | "11" denotes 1st view refers to 1st view only, and 2nd view refers to 2nd view only. |
| | | "00" denotes no restricted referencing. |

FIG.10

Required Parameter Switch Typical Case In BackEndProcessor

| | 3D | | | 2D | |
|---|---|---|---|---|---|
| FS | 1280 | ×720 | ×(30×2) | 1280 ×720 ×30 | | |
| SBS | (960×2) | ×540 | ×60 | 1920 ×540 ×60 | | |
| TAB | 1920 | ×(270×2) | ×60 | 1920 ×540 ×60 | | |

Example of the procedure to switch 3D/2D

FIG.18
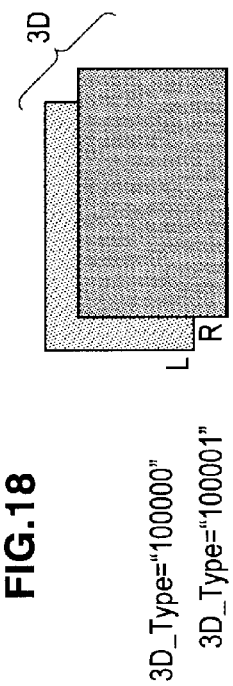
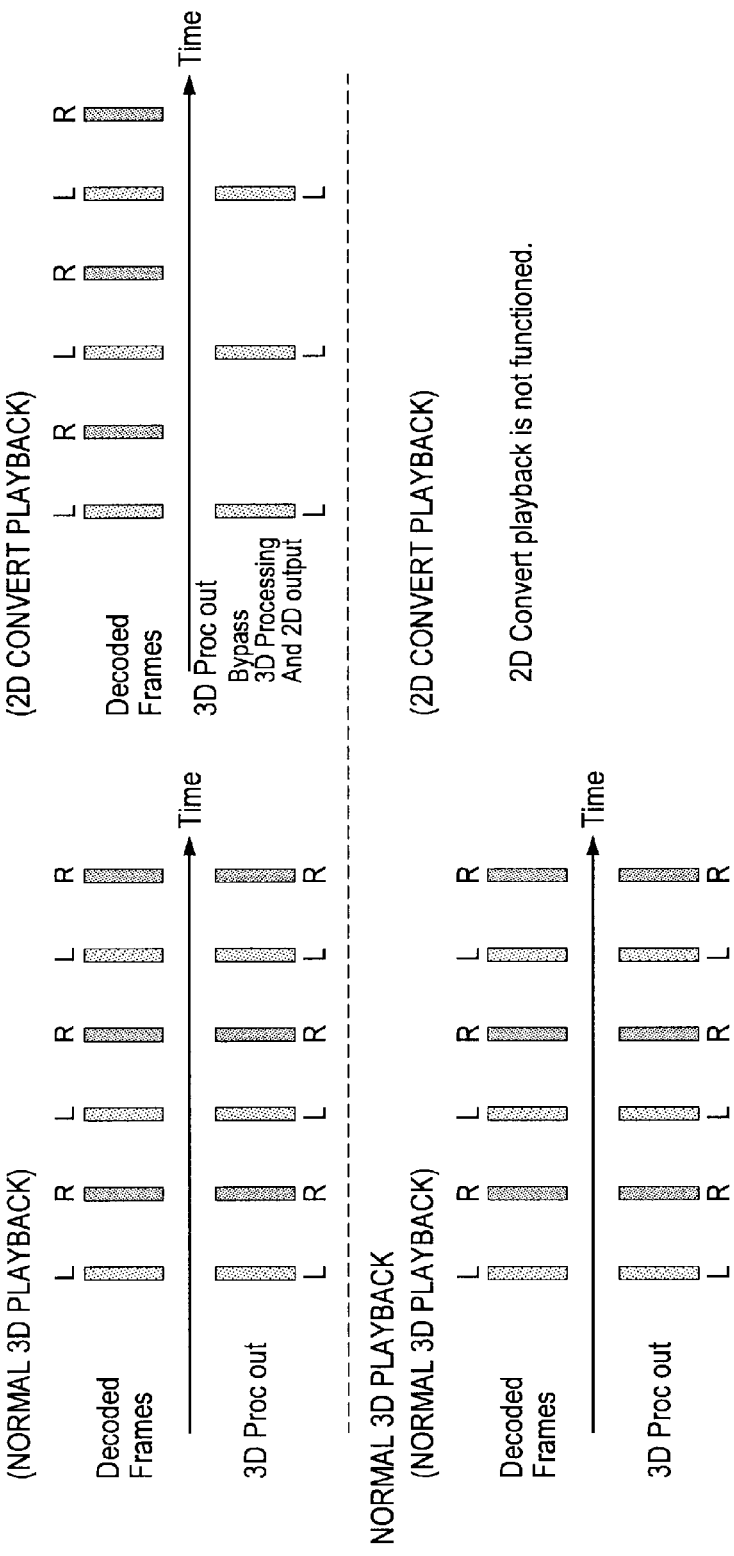

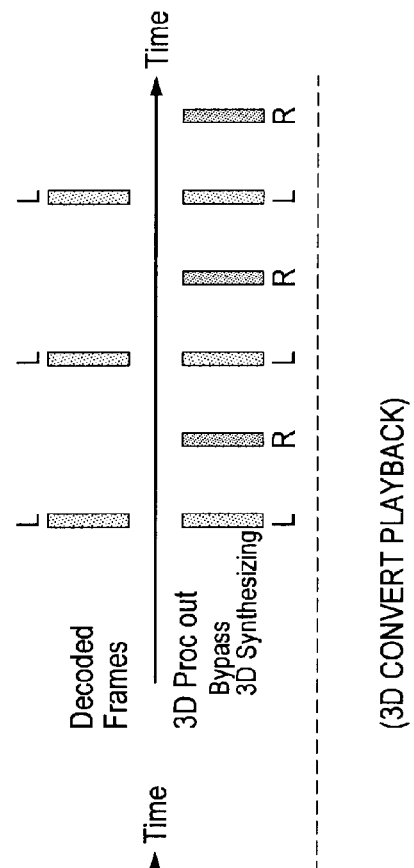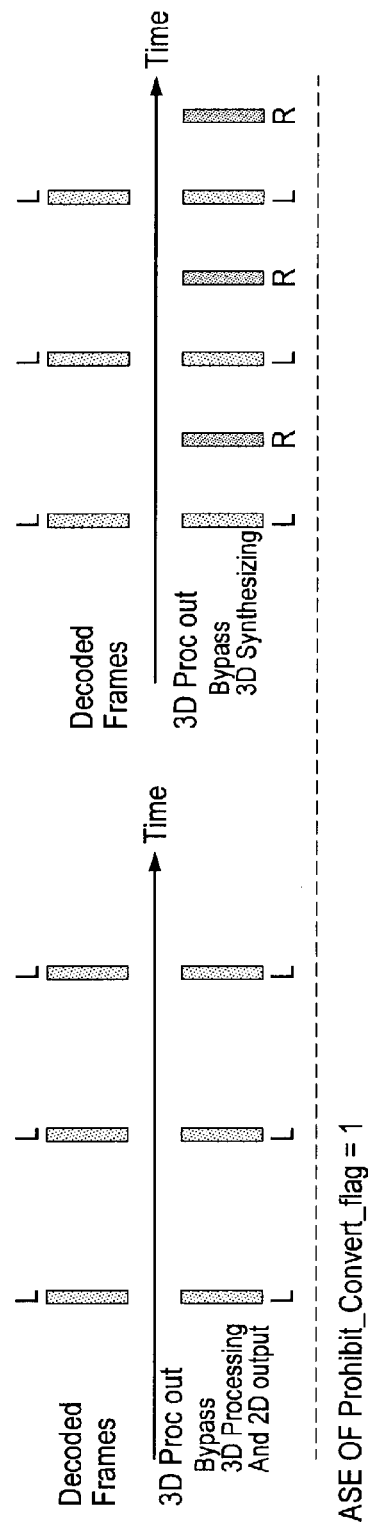

METHOD AND RECEIVER FOR ENABLING SWITCHING INVOLVING A 3D VIDEO SIGNAL

CROSS-REFERENCES TO RELATED APPLICATIONS

The present application is a national phase entry under 35 U.S.C. §371 of International Application No. PCT/JP2010/069154 filed Oct. 28, 2010, published on May 12, 2011 as WO 2011/055674 A1, which claims priority from Japanese Patent Application No. JP 2009-254471 filed in the Japanese Patent Office on Nov. 5, 2009 and Japanese Patent Application No. JP 2010/022240 filed on Feb. 3, 2010.

TECHNICAL FIELD

The present invention relates to a receiver, a transmitter, a communication system, a display control method, a program, and a data structure.

BACKGROUND ART

In the related art, various systems to display stereoscopic video have been known. For example, as described in Patent Literatures 1 to 3, a method of alternately supplying a left-eye image and a right-eye image with a parallax therebetween to a display in a predetermined cycle and observing these images by using glasses including a liquid crystal shutter driven in synchronization with the predetermined cycle has been known.

CITATION LIST

Patent Literature

Patent Literature 1: JP 9-138384A
Patent Literature 2: JP 2000-36969A
Patent Literature 3: JP 2003-45343A
Patent Literature 4: US Patent Application Laid-Open No. 2009/092335
Patent Literature 5: US Patent Application Laid-Open No. 2009/096864

SUMMARY OF INVENTION

Technical Problem

When it is assumed that content such as a TV program is transmitted from a broadcasting station to a user's TV set, transmitting by switching 3D video and 2D video as video data can be considered. For example, a case when the main portion of a program is transmitted as 3D video and commercials as 2D video can be considered.

Various modes such as the side-by-side mode, top and bottom mode, and field sequential mode are known as 3D video modes. Thus, it is assumed that video data transmitted from the side of a broadcasting station is transmitted after being dynamically switched between various methods adjusting to video content.

In such a case, it is assumed that the TV set on the user side may not be able to display an image properly immediately after switching. This is because various parameters (such as the image size and frequency) concerning video before and after switching change and thus, it becomes necessary to switching display processing on the side of the TV set. To display images properly immediately after switching, it is necessary to communicate details including timing of format switching to the receiver, but the technology in the related art in Patent Literatures 4 and 5 does not assume such a mechanism.

The present invention has been made in view of the above issue and it is desirable to provide a receiver capable of realizing the proper display immediately after switching when a video signal including stereoscopic video is switched, a transmitter, a communication system, a display control method, a program, and a data structure.

Solution to Problem

According to an aspect of the present invention to solve the above issue, there is provided a receiver including a decode processing unit that decodes a video signal received from outside; an identification information acquisition unit that acquires identification information including a format concerning 2D or 3D of video from a layer corresponding to each frame of the video signal; and a processing unit that performs processing for an image display by the video signal based on the identification signal.

The processing unit may include a scaling unit that performs spatial or temporal scaling of video data by the video data based on the identification information and, when the format of the video is switched, switches parameters for the scaling adjusting to switching timing.

The identification information may contain offset information indicating the timing when the switching of the 3D format of the video occurs or the timing when the switching of the 3D video and the 2D video occurs and the scaling unit may start, based on the offset information, the processing to switch the parameters before the timing when the switching occurs.

The identification information may contain offset information indicating the timing when the switching of the 3D format of the video occurs or the timing when the switching of the 3D video and the 2D video occurs and the scaling unit may start, based on the offset information, the processing to switch settings of a temporary buffer to hold the decoded video signal before the timing when the switching occurs.

The identification information may contain information representing at least one of a side-by-side mode, a top and bottom mode, and a frame sequential mode as the 3D format.

The identification information may contain information indicating whether spatial or temporal phases of two views for a left eye and a right eye according to the 3D format have same phases or different phases.

The scaling unit may perform, as the spatial scaling, the processing to expand the video decoded by the decode processing unit in a screen vertical direction or a screen horizontal direction.

The scaling unit may perform, as the temporal scaling, copying or interpolation processing of video frames arranged chronologically.

The identification information may contain information to prohibit a conversion of the format of the video.

According to another aspect of the present invention to solve the above issue, there is provided a transmitter including a code processing unit that encodes a video signal, an identification information insertion unit that inserts identification information including at least a format concerning 2D or 3D of video into a layer corresponding to each frame of the video signal, and a transmitting unit that transmits the video signal into which the identification information is inserted.

According to another aspect of the present invention to solve the above issue, there is provided a communication system including a transmitter having a code processing unit that encodes a video signal, an identification information insertion unit that inserts identification information including a format concerning 2D or 3D of video into a layer corresponding to each frame of the video signal, and a transmitting unit that transmits the video signal into which the identification information is inserted, a decode processing unit that decodes the video signal received from the transmitter, and a receiver having an identification information acquisition unit that acquires the identification information including the format concerning 2D or 3D of the video from the layer corresponding to each frame of the video signal and a processing unit that performs processing for an image display by the video signal based on the identification signal.

According to another aspect of the present invention to solve the above issue, there is provided an image display method including decoding a video signal received from outside, acquiring identification information including a format concerning 2D or 3D of video from a layer corresponding to each frame of the video signal, and performing processing for an image display by the video signal based on the identification signal.

According to another aspect of the present invention to solve the above issue, there is provided a program causing a computer to function as a unit to decode a video signal received from outside, to acquire identification information including a format concerning 2D or 3D of video from a layer corresponding to each frame of the video signal, and to perform processing for an image display by the video signal based on the identification signal.

According to another aspect of the present invention to solve the above issue, there is provided a data structure of a digital broadcasting signal containing a video signal related to content to be broadcast, wherein identification information including a format concerning 2D or 3D of video is inserted into a layer corresponding to each frame of the video signal and a receiver is caused to function as a unit to perform processing for an image display by the video signal.

Advantageous Effects of Invention

According to the present invention, when a video signal including stereoscopic video is switched, a proper display can be realized immediately after the switching.

BRIEF DESCRIPTION OF DRAWINGS

FIG. 3 is a schematic diagram providing an overview of information added to a stream syntax of a codec layer of each frame.

FIG. 4 is a schematic diagram showing details of information added to the stream syntax of the codec layer of each frame.

FIG. 5 is a schematic diagram illustrating details of a 3D type.

FIG. 6 is a schematic diagram illustrating details of the 3D type.

FIG. 7 is a schematic diagram showing other information added to the syntax.

FIG. 10 is a schematic diagram showing parameters before and after switching in a Backend Processor.

FIG. 18 is a schematic diagram showing an operation of the receiver based on a conversion prohibition flag.

FIG. 20 is a schematic diagram showing the operation of the receiver based on the conversion prohibition flag.

DESCRIPTION OF EMBODIMENT

Figure 1:
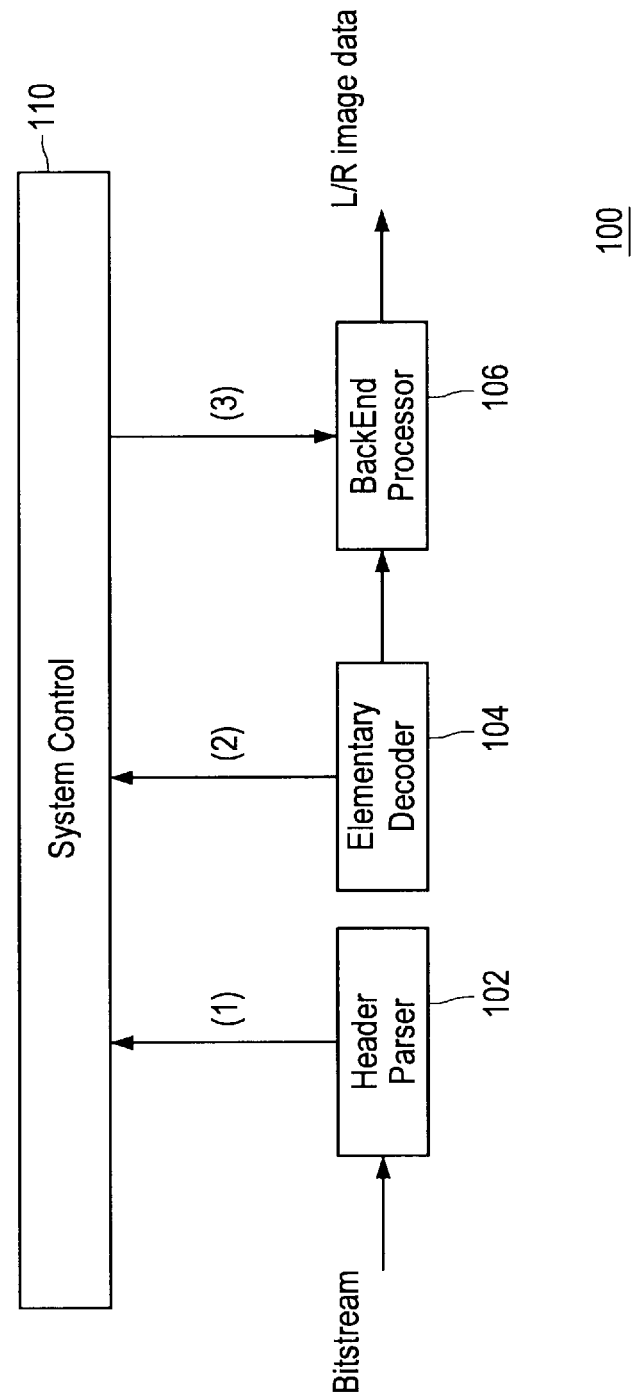
FIG. 1 is a schematic diagram showing a configuration example of a receiver according to an embodiment of the present invention.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description will be provided in the order shown below:
(1) Configuration example of the receiver
(2) Example of switching from the 3D type
(3) Information added to the codec layer
(4) 3D type switching
(5) Parameter before and after switching in the Backend Processor
(6) Concept of view copy
(7) Changes of memory settings
(8) Configuration example of the transmitter

[(1) Configuration Example of the Receiver]

First, an outline configuration of a receiver 100 according to the present embodiment will be described based on drawings. FIG. 1 is a schematic diagram showing a configuration example of the receiver 100. As an example, the receiver 100 is a TV set that receives digital terrestrial broadcasting or the like and receives a bit stream of, for example, stereoscopic video (3D video) composed of left-eye video and right-eye video and decodes the bit stream before causing a display panel to display the bit stream. The receiver 100 also receives a bit stream of normal two-dimensional video (2D video) and combines the bit stream before causing the display panel to display the bit stream.

A transmitter according to the present embodiment transmits by appropriately switching 3D and 2D video in accordance with video sources. For example, the main portion of a program is transmitted as 3D video and commercials inserted therebetween is transmitted as 2D video. When transmitting 3D video, the transmitter may transmit by appropriately switching 3D video of different formats (modes). 3D video formats include, for example, the side-by-side mode, top and bottom mode, and frame sequential mode.

Thus, it becomes necessary for the receiver 100 side to switch reception processing statically or dynamically in accordance with video switching from the transmitter. Thus, in the present embodiment, when dynamically switching between 3D formats or between 3D and 2D, a switching format is inserted into the stream syntax of the layer of codec and also a parameter of the time offset before switching is inserted. Accordingly, sufficient temporal preparations can be secured for the processing system of an image processor on the side of the transmitter 100 for target timing of switching.

If, for example, dynamically switched between 3D and 2D, an extra memory is necessary. Moreover, when switching occurs, it may become necessary to release a memory. As will be described later, it may take time in units of seconds to release or initialize a memory.

In such a case, if time information before switching is input using a container layer such as the time stamp (TS), the time information depends on the time stamp and thus, it is difficult to directly associate the direct time relationship with V synchronization of video. Furthermore, the time stamp may not be attached to all pictures and thus, it is difficult to control switching with precision in synchronization with video frames.

Thus, according to the present embodiment, the parameter of time offset before switching is basically inserted into a position corresponding to the picture header in the layer of codec. Accordingly, a parameter is inserted into each frame of a video signal so that the timing of the video signal can be processed in units of frame. The timing and position of a left-eye image L and a right-eye image R are inserted as other parameters. Accordingly, decoded pictures can be displayed in the correct order. In the description that follows, it is assumed that SEI (Supplemental enhancement information: user data) is defined in the MPEG-4 AVC (H.264/MPEG-4 AVC) standard and is inserted into a picture unit equivalent position. Accordingly, identification information is inserted into each frame and a direct relationship with a 3D video format is maintained so that switching timing in the video cycle can easily be managed. The above information is inserted into the picture header of a bit stream, but in the case of, for example, MPEG-4 AVC, the information may additionally be inserted into sequence parameters (sequence header), GOP unit equivalent picture parameters or the like. Accordingly, parameters like the time offset can be acquired without viewing information in a higher layer. The above content also applies when the codec is not only MPEG4 AVC, but also MPEG2 video, VC-1, or MPEG4 Visual.

As will be described later, 2D content and 3D content are mixed in one stream in the present embodiment and when 2D is transmitted after being converted into a 3D format, a flag is provided so that the display side can identify a difference whether the format before the conversion is 2D or 3D.

As shown in FIG. 1, the receiver 100 includes a header parser 102, an elementary decoder 104, a backend processor 106, and a system control 110. The configuration shown in FIG. 1 can be set up by a circuit (hardware) or a CPU (central processing unit) and a program (software) to cause the circuit or CPU to function. In this case, the program can be stored in a memory included in the receiver 100 or an external storage medium.

In FIG. 1, the header parser 102 detects that 3D is contained in a stream received from the transmitter and notifies the system control 110 of the detection. The elementary decoder 104 decodes video data of the stream received from the transmitter and outputs the decoded video data to the backend processor 106. The elementary decoder 104 also detects information of 3D_Type in the video stream and notifies the system control 110 of the image size, frame structure, and frame frequency along with Picture_type information. If the video data has a time stamp, the elementary decoder 104 adds the time stamp to the above information before a notification is made to the system control 110.

The system control 110 specifies pictures to be displayed from the output buffer of the decoder in the order of time stamp or in accordance with Picture_Type and makes a notification thereof to the backend processor 106. In accordance with the notification from the system control 110, the backend processor 106 sets the output order of each picture fetched from the buffer in which decoded data is accumulated and outputs the output order to the subsequent stage. If, for example, B pictures of MPEG-4 AVC are decoded, a re-order occurs and the backend processor 106 specifies the output order of each frame under instructions of the system control 110.

At this point, the system control 110 notifies the backend processor 106 of information of 3D_Type, image size, and frame structure of the video data and also specifies necessary spatial scaling or temporal processing such as deinterlacing. Then, during the count-down by FrameCountDown, the system control 110 specifies the time (number of frames) before switching in accordance with the value thereof and the newly switched 3D_Type.

Preparations are made inside the backend processor 106 so that processing can be switched smoothly in the timing when 3D_Type switching occurs and the processing system is switched in synchronization with the switching point. As will be described in detail later, the backend processor 106 mainly performs spatial and temporal scaling processing in accordance with 3D_Type and 2D_Type and prepares the memory configuration so that processing can be switched smoothly.

As processing specific to 3D video, the backend processor 106 interleaves image data of the left-eye image L and the right-eye image R after being decoded in the time direction to make the image data suitable for a 3D display system. Alternatively, the backend processor 106 interleaves the left-eye image L and the right-eye image R in the direction perpendicular to the screen for each line to make the image data suitable for a 3D display system. Both display methods require 3D glasses, but as is publicly known, display devices with naked eyes already exist.

[(2) Example of Switching from the 3D Type]

Figure 2:
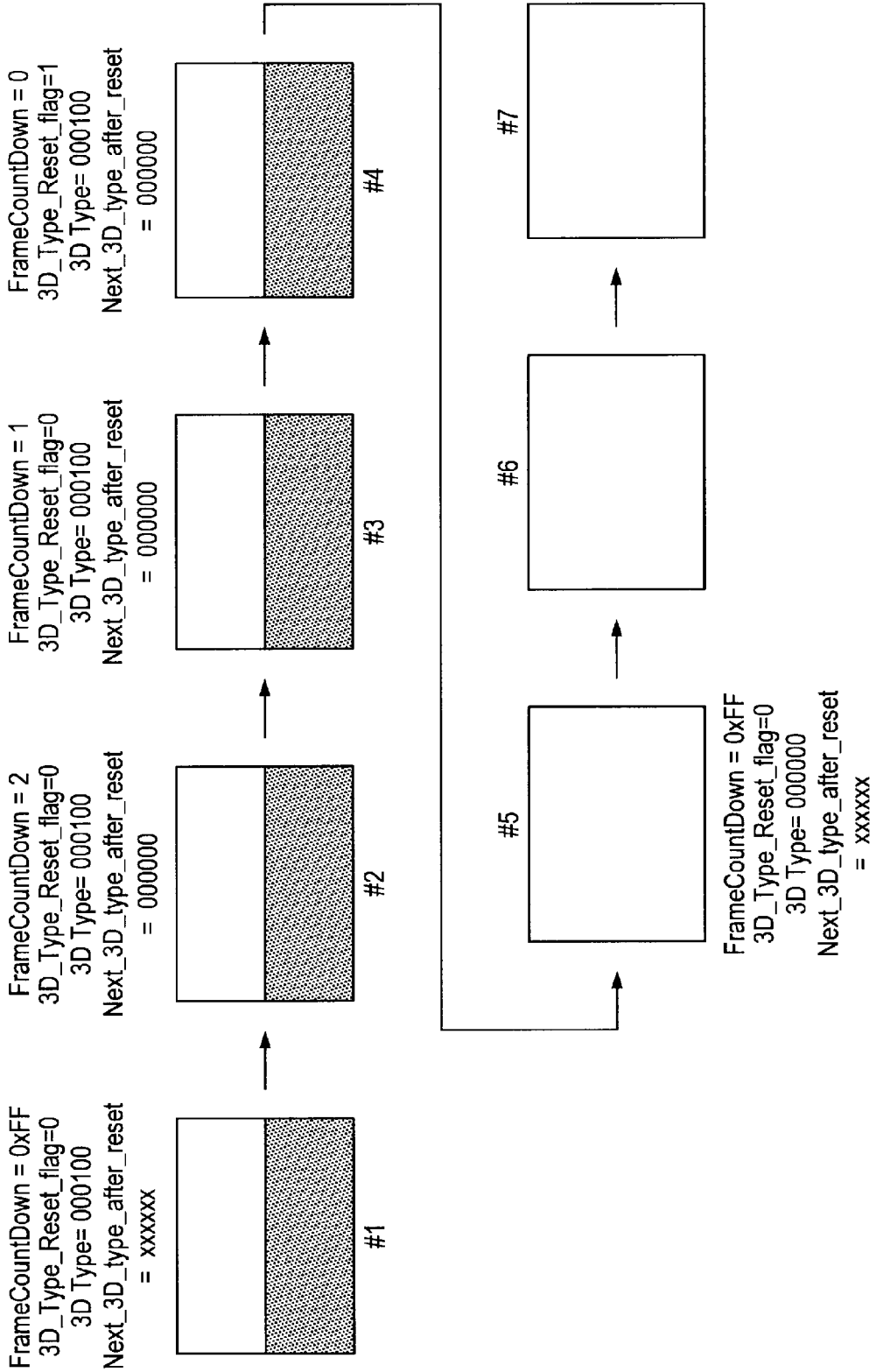
FIG. 2 is a schematic diagram showing an example in which switching of 3D_Type occurs.

FIG. 2 is a schematic diagram showing an example in which switching of 3D_Type occurs and shows a case when 3D_Type changes from the top and bottom mode to the frame sequential mode. FIG. 2 shows how frames change from #1 to #7 chronologically. Each frame has information of the frame count-down value (FrameCountDown), 3D type reset flag (3D_Type_Reset_flag), 3D type (3D_Type), and next 3D type after switching (Next_3D_type_after_reset) added to the stream syntax of the coded layer. Thus, the receiver 100 acquires these information from each frame.

The frame count-down value is a value indicating the number of frames before switching. In the example in FIG. 2, switching is not specified for frame #1 and the frame count-down value for frame #1 is set to 0xFF. Thus, when data of #1 is received, no switching is recognized. The next frame #2 has the count-down value of 2. This shows that switching will occur when two frames pass after frame #2. The frame count-down value decreases by 1 in the subsequent frames #3 and #4 and becomes 0 in frame #4 immediately before switching.

The 3D type reset flag is a flag indicating that the 3D type is reset. If the 3D type reset flag is set to 0, this indicates that the 3D type is not reset and the same 3D is set in the next frame. On the other hand, if the 3D type reset flag is set to 1, the 3D type is reset in the frame to end the 3D type up to the current frame and a different 3D type is set in the next frame.

The 3D type is information indicating the 3D type of the current frame. In frame #1, the 3D type is 000100 and this 3D type indicates that, as will be described later, the 3D mode of the current frame is the top and bottom mode. In frame #5 after the 3D type is switched, the 3D type is 000000 and this 3D type indicates that the 3D mode of the current frame is the 2D mode in the related art.

The next frame type is information indicating the frame type after a reset. If the 3D type is reset, the 3D type after switching is shown in the next frame type. If, for example, the count-down value is set to 2 in frame #2, the frame is reset after two frames and 000000 indicating the 2D in the related art is specified as the next frame type. In the stage of frame #1, the frame count-down value is 0x00 and whether the 3D type will be switched is not indicated and thus, the next frame type is indicated as xxxx.

Therefore, in the example in FIG. 2, data is transmitted in top and bottom mode in frame #1 without indicating whether the 3D type will be switched. In frame #2, the frame count-down value is set to 2, which indicates that the current 3D type (top and bottom mode) is reset after two frames and switched to the frame sequential mode, which is the next frame type. In frame #3, the frame count-down value is set to 1, which indicates that the current 3D type is reset in the next frame and switched to the 2D in the related art, which is the next frame type. Then, in frame #4, the frame count-down value is set to 0 and the 3D type reset flag is set to 1, which indicate that the current 3D type is reset in the current frame and from the next frame onward, the 3D type is switched to the 2D in the related art, which is the next frame type.

In frame #5, the 3D type is set to 000000, which indicates that 3D data of the current frame is in 2D mode in the related art. Moreover, the frame count-down value is set to 0xFF and the 3D type reset flag is set to 0 and thus, whether the 3D type will be switched is not indicated. Because no occurrence of switching is indicated, the next frame type is indicated as xxxxxx.

In the example in FIG. 2, as described above, information of the frame count-down value, 3D type reset flag, 3D type, and next 3D type is added to the stream syntax of codec layer. Therefore, the receiver 100 can acquire the 3D type of the current frame and whether switching of the 3D type occurs next and timing up to switching of the 3D type can be acquired in advance. Accordingly, preparations for processing of the scaler in accordance with switching and preparations for changing the memory configuration can be made in advance.

[(3) Identification Information Added to the Codec Layer]

FIG. 3 is a schematic diagram providing an overview of identification information added to the stream syntax of the codec layer of each frame. As shown in FIG. 3, the 8-bit 3D format signaling ID is added to the stream syntax as user data and also the 3D type reset flag (1 bit), conversion prohibition flag (1 bit), reserved bits (6 bits), frame count-down value (Frame_Countdown_to_reset, 8 bits), 3D type (6 bits), view copy (View_copy, 1 bit), L_First_flag (1 bit), next 3D type (6 bits), and Reference_Dependency (2 bits).

The 3D format signaling ID is generally user data and corresponds, in MPEG4-AVC, to the user definition of SEI. Each of the above data can be added in the same manner as buffering period SEI and picture timing SEI defined in MPEG and is added to each of all frames. The information will be described in detail below.

FIGS. 4, 5, 6, and 7 are schematic diagrams showing details of information added to the stream syntax of the codec layer of each frame. If, as shown in FIG. 4, the 3D type reset flag is 1, the current 3D type is reset in the current frame. If the 3D type reset flag is 0, the current 3D type is maintained. The frame count-down value indicates the time offset value up to the 3D type reset and when the value thereof becomes 0x00, the 3D type reset flag is set to 1. If the frame is not reset immediately in the future and the frame count-down value is not used, the value thereof is set to 0xFF.

FIGS. 5 and 6 are schematic diagrams illustrating details of the 3D type. As shown in FIGS. 5 and 6, in addition to the side-by-side mode and frame sequential mode shown in FIG. 2, various modes can be specified as 3D type information. As will be described below, 100000 and 100001 indicate a case when 3D data is progressive data in field sequential mode. 100000 indicates a 1st view and 100001 indicates a 2nd view. Basically, one of the 1st view and the 2nd view is the left-eye image L and the other is the right-eye image R. Which of the 1st view and the 2nd view corresponds to the left-eye image L or the right-eye image R is specified by L_First_Flag.

Figure 14:
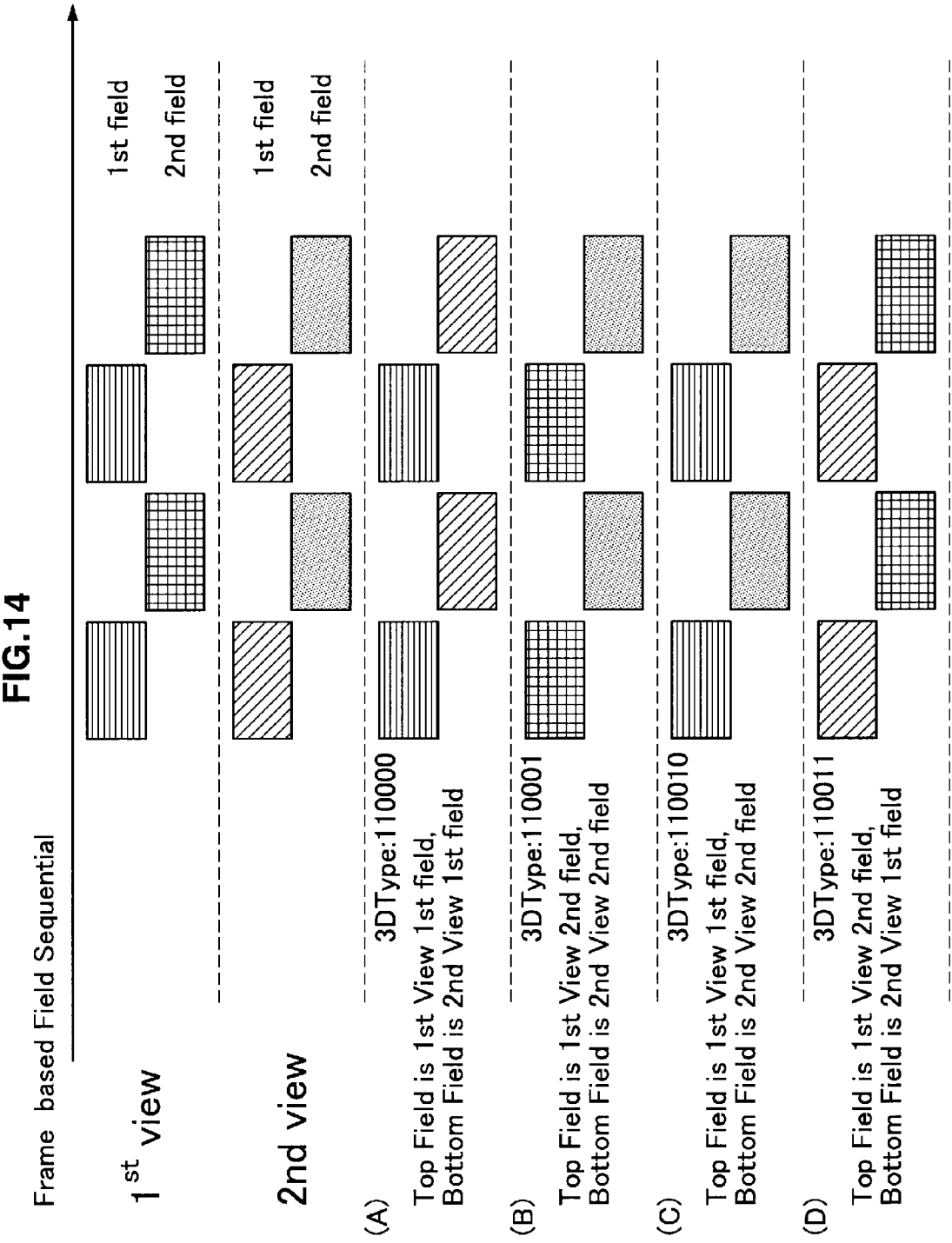
FIG. 14 is a schematic diagram showing frames corresponding to the 3D type when 3D data is an interlaced type of a frame based field sequential method.
Figure 15:
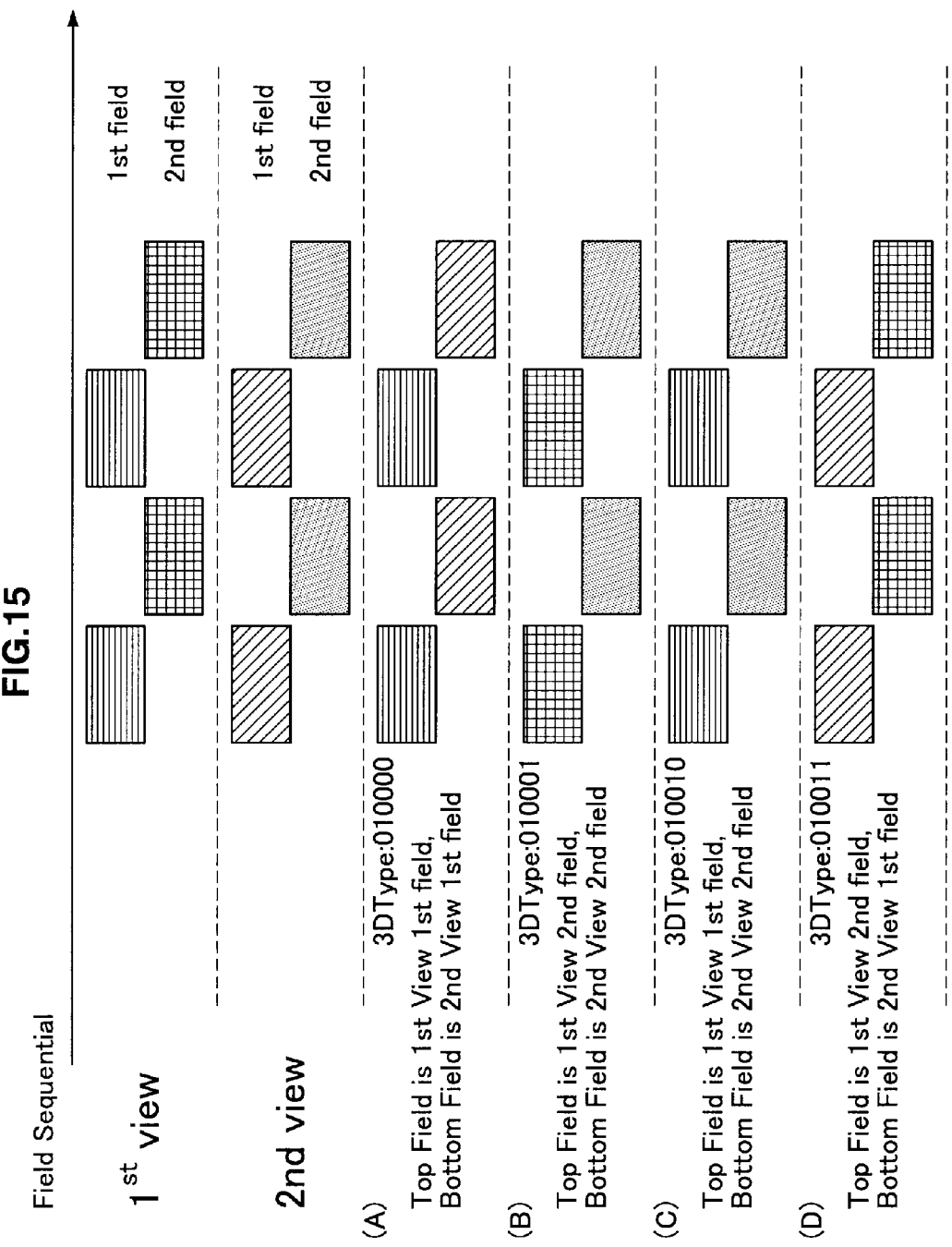
FIG. 15 is a schematic diagram showing frames corresponding to the 3D type when 3D data is of an interlaced type of the field sequential method.

110000, 110001, 110010, and 110011 indicate a case when 3D data is interlaced data in frame-based field sequential mode. 11000 indicates that the top field is 1st view of 1st field of a frame pair and the bottom field is 2nd view of 1st field. 110000 corresponds to FIG. 14A. 110001 indicates that the top field is 1st view of 2nd field of a frame pair and the bottom field is 2nd view of 2nd field. 110001 corresponds to FIG. 14B. 110010 indicates that the top field is 1st view of 1st field of a frame pair and the bottom field is 2nd view of 2nd field. 110010 corresponds to FIG. 14C. 110011 indicates that the top field is 1st view of 2nd field of a frame pair and the bottom field is 2nd view of 1st field. 110011 corresponds to FIG. 14D.

010000 and 010001 indicate a case when 3D data is in field sequential mode and 010000 indicate 1st view of 1st field. 010001 indicates 2nd view of 1st field. 010010 and 010011 indicate a case when 3D data is in field sequential mode and 010000 indicate 1st view of 2nd field. 010011 indicates 2nd view of 2nd field. 010000, 010001, 010010, and 010011 correspond to FIGS. 15A, 15B, 15C, and 15D, respectively.

Thus, in the method of allocating 1st view/2nd view to the top field/bottom field in field sequential mode, whether to adopt fields of the same timing or fields of different timing of respective source images of two views of 1st view/2nd view is made specifiable. This enables an adaptive configuration in accordance with parallax characteristics of source images. Here, there are cases when 1st view adopts the top view of a source image and 2nd view also adopts the top field of the source image and when 1st view adopts the top view of the source image and 2nd view adopts the bottom field of the source image.

Figure 16:
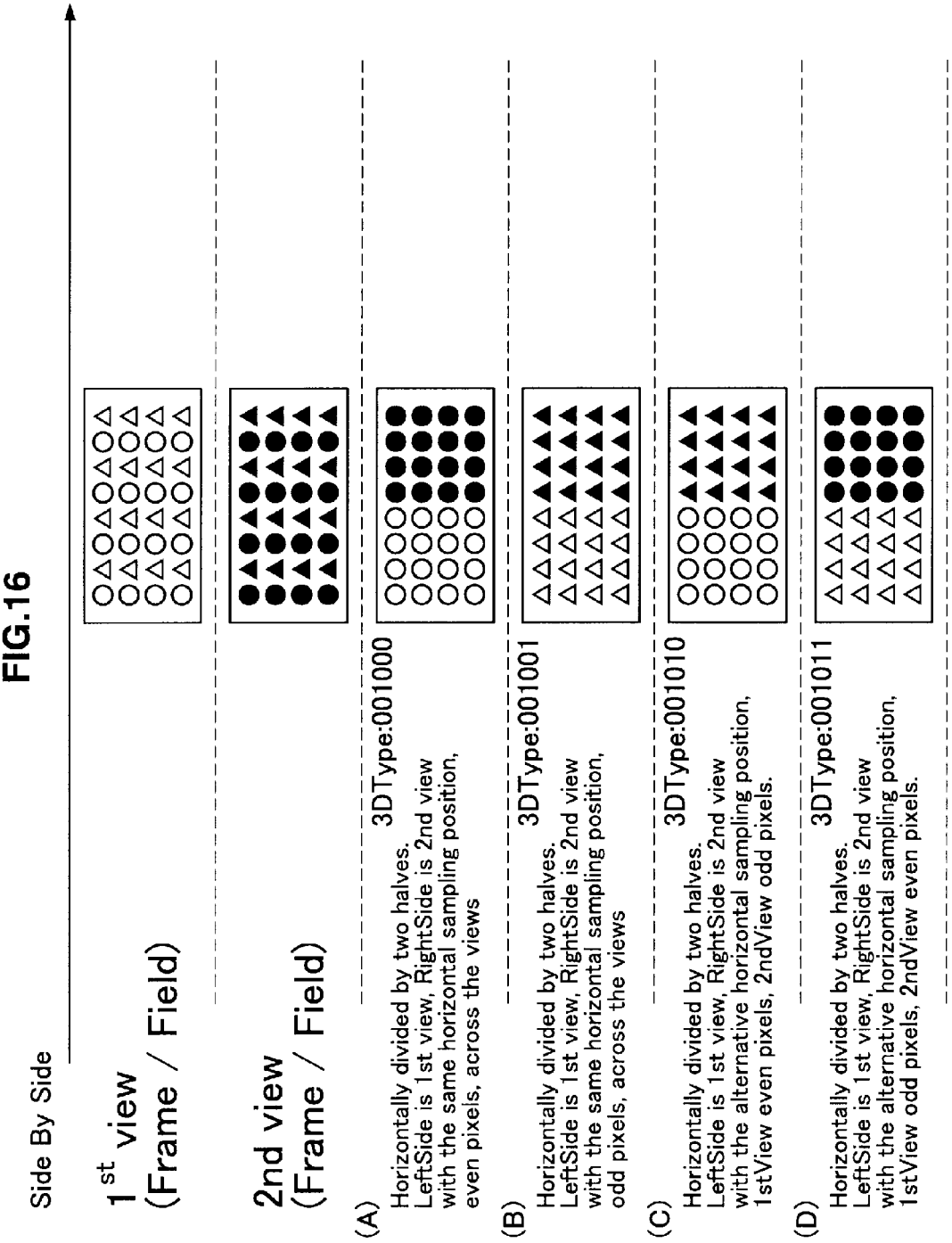
FIG. 16 is a schematic diagram showing frames corresponding to the 3D type when 3D data is in side-by-side mode.

001000 and 001001 indicate the side-by-side mode and also indicate that the left side is 1st view and the right side is 2nd view. Of these, 001000 indicates that the left side and the right side have the same sampling position and the sampling position is in even pixels. 001001 indicates that the left side and the right side have the same sampling position and the sampling position is in odd pixels. 001000 and 001001 correspond to FIGS. 16A and 16B, respectively. 001010 and 001011 indicate the side-by-side mode and also indicate that the left side is 1st view and the right side is 2nd view. Of these, 001010 indicates that the left side and the right side have alternative sampling positions and 1st view is in even pixels and 2nd view is in odd pixels. 001011 indicates that the left side and the right side have alternative sampling positions and 1st view is in odd pixels and 2nd view is in even pixels. 001000 and 001001 correspond to FIGS. 16C and 16D, respectively.

Figure 17:
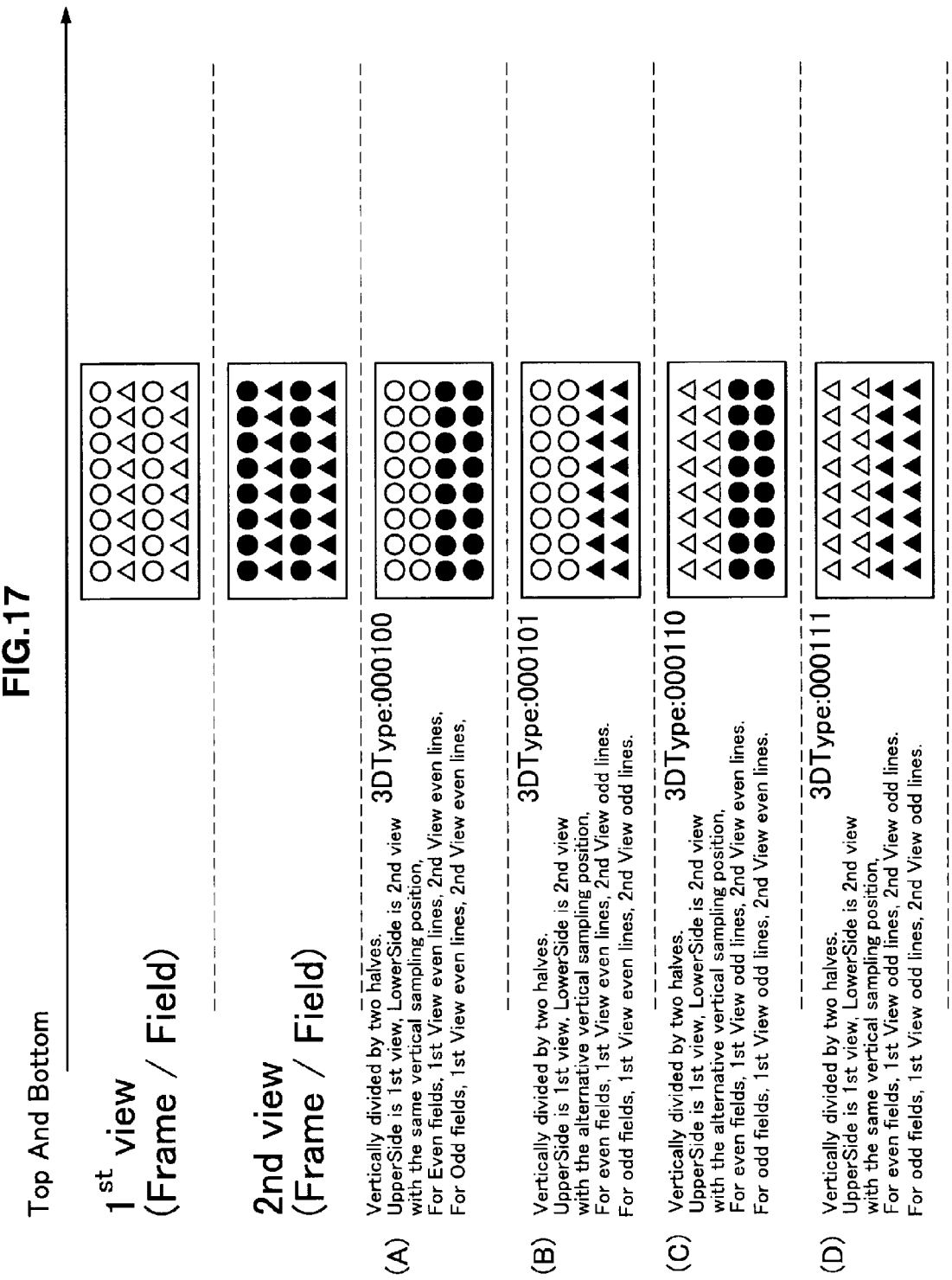
FIG. 17 is a schematic diagram showing frames corresponding to the 3D type when 3D data is in top and bottom mode.

000100 and 000101 indicate the top and bottom mode and also indicate that the upper side is 1st view and the lower side is 2nd view. Of these, 000100 indicates that the upper side and the lower side have the same sampling position and 1st view and 2nd view are both sampled in even lines. 000101 indicates that the upper side and the lower side have alternative sampling positions and 1st view is sampled in even lines and 2nd view is sampled in odd lines. 000100 and 000101 correspond to FIGS. 17A and 17B, respectively.

000110 and 000111 indicate the top and bottom mode and also indicate that the upper side is 1st view and the lower side is 2nd view. Of these, 000110 indicates that the upper side and the lower side have alternative sampling positions and 1st view is sampled in odd lines and 2nd view is sampled in even lines. 000111 indicates that the upper side and the lower side have alternative sampling positions and 1st view and 2nd view are both sampled in odd lines. 000110 and 000111 correspond to FIGS. 17C and 17D, respectively.

By deciding the 3D type as described above, when 1st view and 2nd view are interleaved, whether to allocate the same temporal phase or different phases to the two views can explicitly be shown. By adopting different temporal phases, temporal precision of quality in accordance with the parallax can be improved with different phases when chronologically interleaving in frame sequential or field sequential mode.

Moreover, in spatial phases, particularly sub-samples in the horizontal direction, whether to allocate the same sample phase or different phases can explicitly be shown. Accordingly, for example, when spatially interleaving two views in side-by-side mode, horizontal spatial resolution in a portion with less parallax can be improved by adopting different spatial phases. Also, in sub-samples in the vertical direction, whether to allocate the same sample phase or different phases can explicitly be shown. Accordingly, when spatially interleaving two views in top and bottom mode, vertical spatial resolution in a portion with less parallax can be improved by adopting different spatial phases. According to 3D type settings as described above, a quality improvement effect can be realized by selectively specifying and coding the 3D type when transmitting each format.

If the 3D type is 000000, no 3D format is specified, indicating that video data is 2D. If information of the 3D type (6 bits) shown in FIG. 4 is not added, the receiver 100 handles the data as 2D data.

According to the 3D type information as described above, whether the frame sequential, field sequential, side-by-side, top and bottom, or 2D as the 3D format can be judged by checking the bit where the first 1 of 6 bits is set. Incidentally, the receiving side may reject any other 3D type than the above types.

Information of view copy shown in FIG. 4 is information indicating whether a 3D frame pair (1st view, 2nd view) has been created by copying. If the view copy is 1, this indicates that 2nd view is a copy of 1st view. In this case, 1st view and 2nd view are the same and the 3D frame pair is handled as 2D data on the side of the receiver 100. If the view copy is 0, this indicates that 1st view and 2nd view are independent data and in this case, the receiver side can recognize that the 3D frame pair is 3D data.

FIG. 7 is a schematic diagram showing other information added to the syntax. L_First_Flag is a flag indicating which of the 1st view and the 2nd view corresponds to the left-eye image L or the right-eye image R. If L_First_Flag is 1, this indicates that 1st view is the left-eye image L. If L_First_Flag is 0, this indicates that 1st view is the right-eye image R. The next 3D type is, as described above, information that indicates the 3D type after switching and can be specified in the same manner as the 3D type.

Reference_Dependency is data indicating whether reference data of motion compensation of MPEG or the like extends over frames. If Reference_Dependency is 10, a frame of 1st view uses only frames of other 1st view as reference data and a frame of 1st view does not use any frame of 2nd view as reference data. In this case, no restriction is imposed on 2nd view and a frame of 2nd view can use a frame of 1st view or other 2nd view as reference data.

If Reference_Dependency is 01, a frame of 2nd view uses only frames of other 2nd view as reference data and a frame of 2nd view does not use any frame of 1st view as reference data. In this case, no restriction is imposed on 1st view and a frame of 1st view can use a frame of other 1st view or 2nd view as reference data.

If Reference_Dependency is 11, a frame of 1st view uses only frames of other 1st view as reference data and a frame of 2nd view uses only frames of other 2nd view as reference data. If Reference_Dependency is 00, there is no restriction of reference data for any view.

With an arrangement of Reference_Dependency as described above, processing can be made more efficient by, for example, decoding only 1st view when a 2D image is displayed with the left-eye image L only of received left and right images by only the left-eye image being referenced by 1st view for the left-eye image L.

In the present embodiment, information in FIGS. 3 to 7 is inserted into SEI of MPEG4 AVC. On the other hand, in other codec standards, the information can be inserted into a corresponding location in each frame of a video signal. For example, in MPEG2 video, VC1, or MPEG4 Visual, switching synchronized with the video signal can be realized by inserting insertion into each frame in the layer of a video signal.

For MPEG2 video (H.262 ISO/IEC IS 13818.2 Information Technology-Generic Coding of Moving Picture and Associated Audio Information: Video), for example, the insertion can be inserted into the User data area of the picture header defined for the format. Also in this case, data may further be inserted into sequence header, slice header, or macro block header.

[(4) 3D Type Switching]

Figure 8:
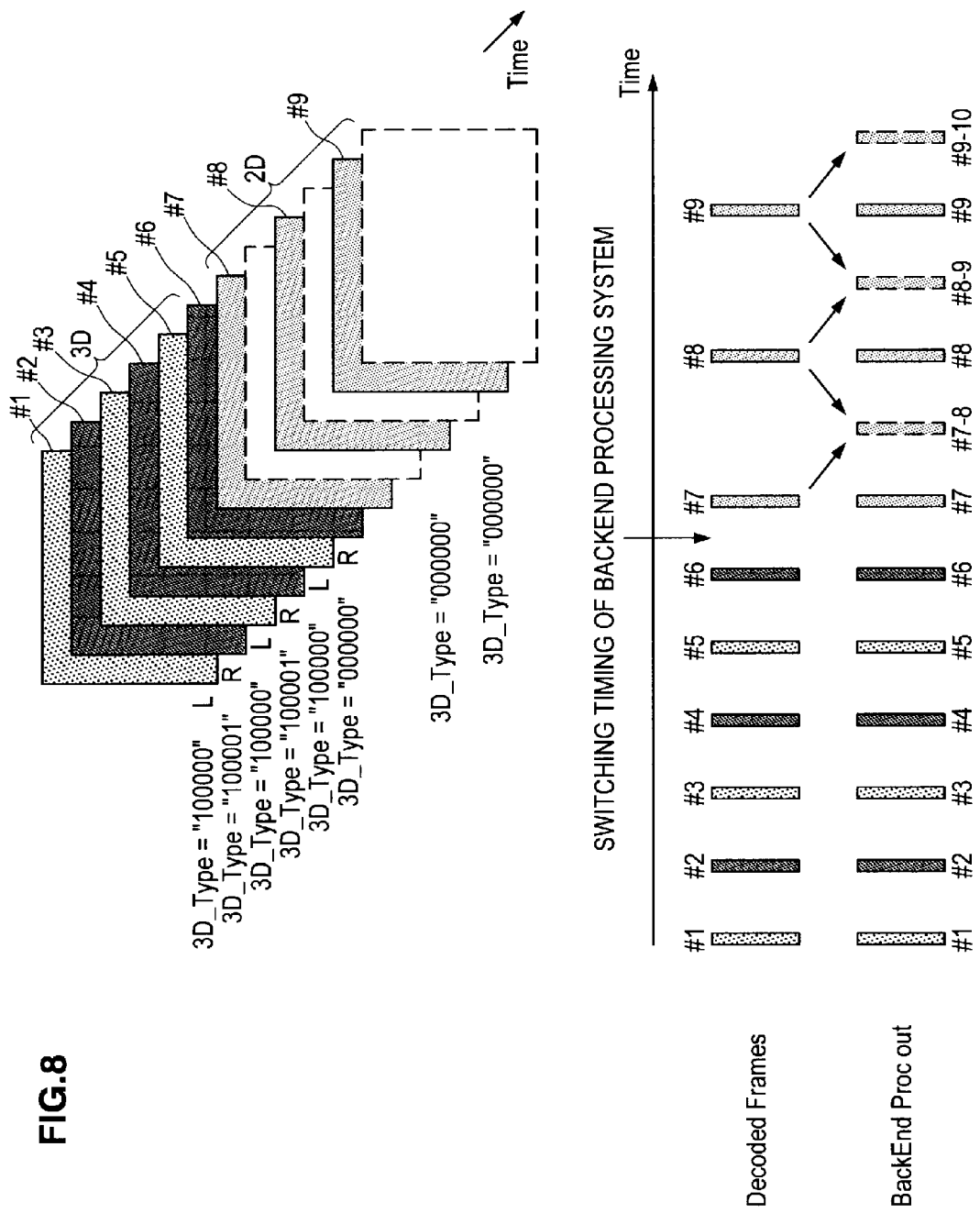
FIG. 8 is a schematic diagram showing a case when the video is switched from 3D to 2D.

Next, 3D type switching will be described in detail. FIG. 8 is a schematic diagram showing a case when the video is switched from 3D to 2D. The upper part of FIG. 8 schematically shows data of each frame received by a receiver and frames #1 to #6 are transmitted at a frequency of 60 [Hz] as progressive data in frame sequential mode after 100000 and 100001 being alternately specified as the 3D type. Then, after data is switched to 2D data in frame #7, 2D data is transmitted at 30 Hz. The 3D type is set to 000000 (Non-3D format) for frame #7 and subsequent frames.

The lower part of FIG. 8 schematically shows data (Decoded Frames) of each frame output from the decoder 104 and data (BackEnd Proc out) of frames output from the backend processor 106. The lower part of FIG. 8 schematically shows a state when viewed from above frames. Data of each frame at the frequency of 60 [Hz] is output up to frame #6 from the decoder 104 and data of frame #7 and subsequent frames is output at the frequency of 30 [Hz].

The backend processor 106 receives output of the decoder 104 and outputs frames #1 to #6 to the display panel at the frequency of 120 [Hz]. The backend processor 108 temporally scales frame #7 and subsequent frames to convert into 120 [Hz] data and outputs the data to the display panel. More specifically, the backend processor 106 performs interpolation processing between, for example, frame #7 and frame #8 to generate frame #7-8 and also generates frame #8-9 by performing interpolation processing between frame #8 and frame #9. As another method, frame #7 may be copied as frame #7-8 and frame #8 may be copied as frame #8-9. If frames #7-8 and #8-9 are generated on the side of the transmitter 100 in advance by view copying, the receiver 100 can display received 2D data as it is. In the case of view copying, 2D data is transmitted at the frequency of 120 [Hz].

In the example of FIG. 8, the receiver 100 can acquire switching timing from 3D to 2D based on the frame count-down value added to each frame. Thus, the backend processor 108 can recognize switching timing of frame #7 in advance and can make preparations necessary for scaling of 2D data. Therefore, when video is switched from 3D to 2D, the display can be made continuously without causing a time lag.

Figure 9:
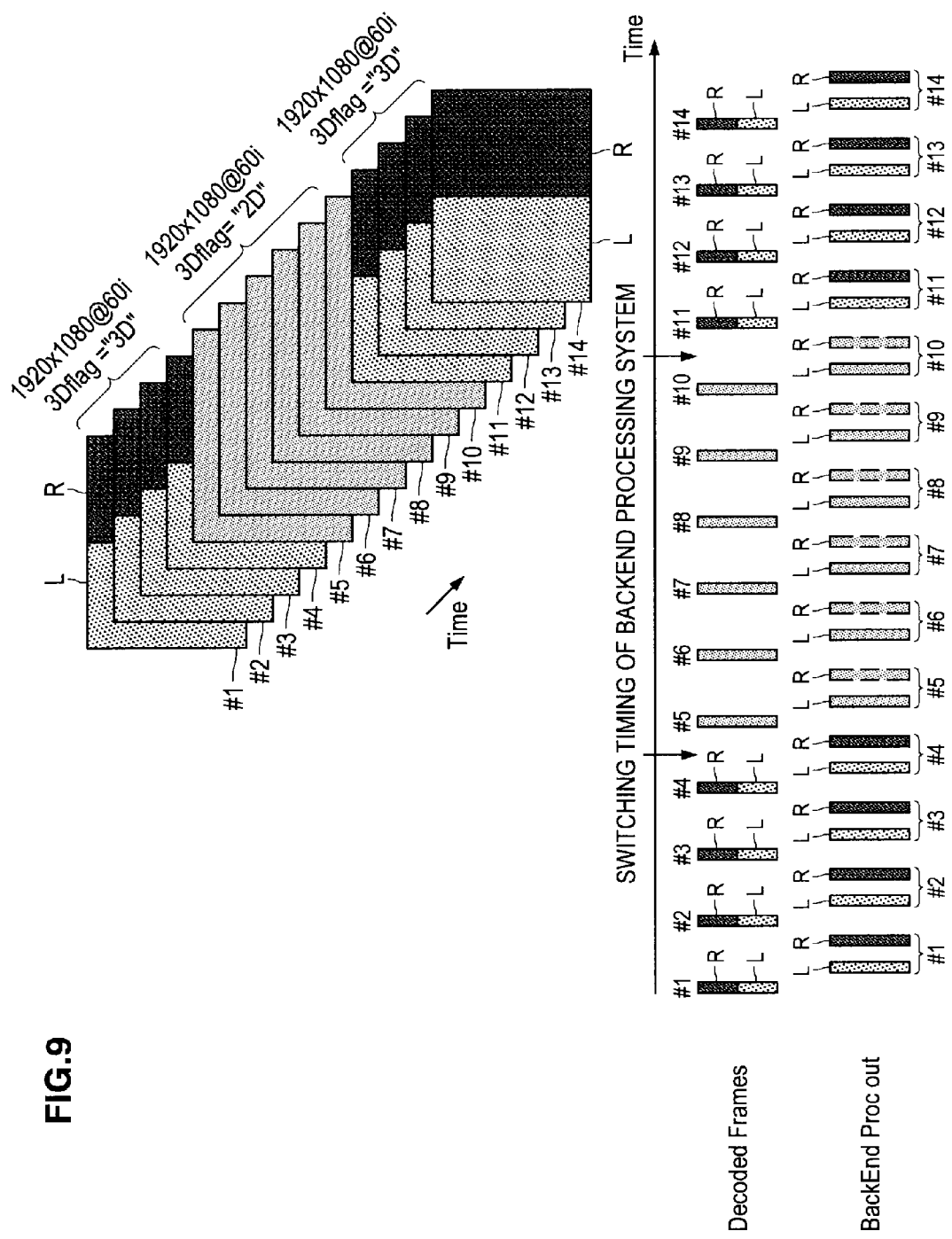
FIG. 9 is a schematic diagram showing a case when the video is switched from 3D to 2D and then, the video is switched from 2D to 3D.

FIG. 9 is a schematic diagram showing a case when the video is switched from 3D to 2D and then, the video is switched from 2D to 3D. As shown in the upper part of FIG. 9, frames #1 to #4 have interlaced (60 i) data of 60 [Hz] with 1920×1080 pixels and the 3D flag of each frame indicates "3D". Then, when 3D data is switched to 2D data in frame #5, interfaced (60 i) data of 60 Hz with 1920×1080 pixels is received. Then, 2D data is switched to 3D data again in frame #11 to obtain interfaced (60 i) data of 60 Hz with 1920×1080 pixels.

The lower part of FIG. 9 schematically shows data (Decoded Frames) of each frame output from the decoder 106 and data (BackEnd Proc out) of frames output from the backend processor 106. The lower part of FIG. 9 schematically shows a state when viewed from above frames and 3D data is in side-by-side mode and thus, L, R data is arranged side by side in the horizontal direction of the screen. Data of each frame in side-by-side mode at the frequency of 60 [Hz] is output up to frame #4 from the decoder 104 and 2D data of frames #5 to #10 is output at the frequency of 60 [Hz]. For frame #11 and subsequent frames, data of each frame in side-by-side mode at the frequency of 60 [Hz] is output.

The backend processor 106 receives output of the decoder 104 and expands each piece of L, R data (each having 960×1080 pixels) in side-by-side mode of frames #1 to #4, #10 to #14 by performing filtering (complementary processing) thereon in the screen horizontal direction to data of 1920×1080 pixels and scales the data in the time base direction before sending the data at 120 [Hz] to the display panel. The backend processor 108 scales (interpolation processing) of 2D frames #5 to #10 in the time base direction to convert to 120 [Hz] data and sends the data to the display panel.

Also in the example of FIG. 9, the receiver 100 can acquire switching timing of 3D↔2D from the frame count-down value added to each frame. Thus, the backend processor 108 can recognize switching timing of frame #4 in advance and can make preparations necessary for interpolation processing of 2D data. Also, the backend processor 108 can recognize switching timing of frame #10 in advance and can make preparations necessary for 3D processing. Therefore, when video is switched between 3D and 2D, the display can be made continuously without causing a time lag.

In FIG. 8, the left-eye image L, the right-eye image R, or 2D image data in frame sequential mode is stored in different areas of the memory after being decoded. Similarly, in FIG. 9, the left-eye image L, the right-eye image R, or 2D image data in side-by-side mode is stored in different areas of the memory after being decoded. Thus, memory areas are different before and after switching and it is necessary to initialize in advance depending on switching timing. In the present embodiment, the time offset before switching is known in advance from the time offset value and preparations for memory initialization can be made before switching.

In the example in FIG. 9, the algorithm for interpolation processing is different between 3D and 2D in processing by the backend processor 106. Also in this case, the time offset before switching is known in advance from the time offset value and preparations for algorithm switching can be made before switching.

[(5) Parameter Before and after Switching in the Backend Processor]

FIG. 10 is a schematic diagram showing parameters before and after switching in the backend processor 108 when the above switching occurs. The first column in FIG. 10 shows parameter changes when video is switched between 3D and 2D after video data in field sequential (FS) mode being received. In this example, it is assumed that the 3D data has 1280×720 pixels and the frequency of left/right video is 30×2=60 [Hz]. That is, L, R data is each output from the decoder 104 at the frequency of 30 [Hz] and the frequency of left/right video is 30×2=60 [Hz]. On the other hand, the 2D data also has 1280×720 pixels, but is output from the decoder 104 at the frequency of 30 [Hz]. Thus, when switching from 3D to 2D occurs, the backend processor 108 performs scaling in the time direction to perform complementary processing of the 2D data for output at the frequency of 60 [Hz]. Accordingly, when video is switched between 3D and 2D, the video before and after switching can be made to have the same frequency and processing of the display panel can be performed in the same manner and also a sense of discomfort felt by the user during switching can be reduced to a minimum.

The second column in FIG. 10 shows parameter changes when video is switched between 3D and 2D after the 3D data in side-by-side (SBS) mode being received. In this example, it is assumed that each of L, R of the 3D data has 960×540 pixels and one frame in which L and R are arranged in the screen horizontal direction is output from the decoder 104 at the frequency of 60 [Hz]. On the other hand, the 2D data has 1920×540 pixels and is output from the decoder 104 at the frequency of 60 [Hz]. Thus, the backend processor 108 performs scaling of each of L, R of the 3D video in the space direction to output data of 1920×540 pixels. More specifically, filtering (complementary processing) to increase the number of pixels in the screen horizontal direction of a frame to 960×2=1920 is performed. On the other hand, both of 3D and 2D have the output frequency of 60 [Hz] from the decoder 104 and thus, no scaling is performed. Accordingly, when video is switched between 3D and 2D, the video before and after switching can be made to have the same number of pixels.

The third column in FIG. 10 shows parameter changes when video is switched between 3D and 2D after the 3D data in top and bottom (TAB) mode being received. In this example, it is assumed that each of L, R of the 3D data has 1920×270 pixels and one frame in which L and R are arranged in the screen horizontal direction is output from the decoder 104 at the frequency of 60 [Hz]. On the other hand, the 2D data has 1920×540 pixels and is output from the decoder 104 at the frequency of 60 [Hz]. Thus, the backend processor 108 performs scaling of each of L, R of the 3D video in the space direction to output data of 1920×540 pixels. More specifically, complementary processing to increase the number of pixels in the screen vertical direction of a frame to 270×2=540 is performed. On the other hand, both of 3D and 2D have the output frame frequency of 60 [Hz] from the decoder 104 and thus, no scaling is performed. Accordingly, when video is switched between 3D and 2D, the video before and after switching can be made to have the same number of pixels.

In the spatial and temporal scaling of image data as described above, it is difficult to display scaled proper images immediately after switching if parameters after conversion are not known in advance. In the present embodiment, the frame count-down value and the next 3D type after conversion can be acquired before the conversion and thus, switching preparations for spatial and temporal scaling can be made before the switching timing. Therefore, properly scaled images can be displayed immediately after switching.

Figure 11:
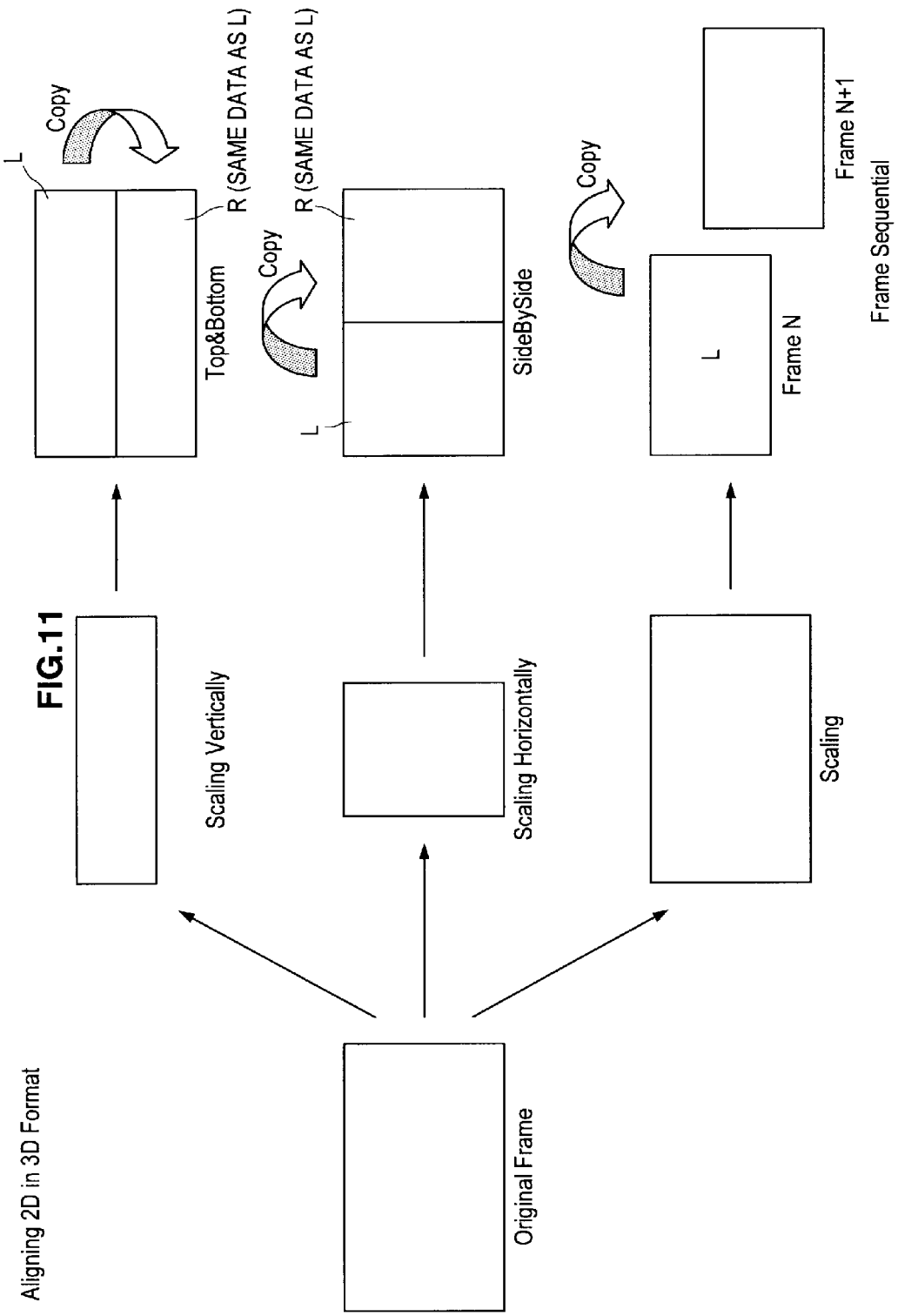
FIG. 11 is a schematic diagram illustrating a concept of view copy.

FIG. 11 is a schematic diagram illustrating the concept of view copy. The view copy is used to copy one of L, R of 3D video as the other to create the same video data of L, R on the transmitter side and to transmit the data as 2D data to the receiving side. As shown in FIG. 11, in top and bottom mode, original frame data (Original Frame) is compressed vertically (Scaling Vertically) and the same compressed data is arranged vertically in each of L, R areas of top and bottom. If, for example, the original frame is the left-eye image L and the 2D display is made only with the left-eye image L by view copying, data of the left-eye image L compressed vertically is arranged in the area of the left-eye image L of the top and bottom and the left-eye image L is copied to the area of the right-eye image R (lower area).

In side-by-side mode, original frame data is compressed horizontally (Scaling Horizontally) and the same compressed data is arranged vertically in each of L, R areas of side by side. If, for example, the original frame is the left-eye image L and the 2D display is made only with the left-eye image L by view copying, data of the left-eye image L compressed horizontally is arranged in the area of the left-eye image L of the side by side and the left-eye image L is copied to the area of the right-eye image R (right area).

In frame sequential mode, predetermined scaling (compression) is performed on the original frame data and then, data of a frame N, which is the left-eye image L, to the next frame N+1 in the time base direction. Accordingly, while the original frame N+1 of 3D has the right-eye image R, the left and right videos become the same by copying the left-eye image L and the 2D video can be displayed with the left-eye image L only.

If View_Copy described in FIG. 4 is 1, 2nd view is a copy of 1st view and a view copy as shown in FIG. 11 is made. Thus, when 2D data is received, the receiver 100 can recognize that the 2D data is originally 3D data and is generated by copying one of L, R of original data to the other by referencing data of View_Copy.

[(7) Changes of Memory Settings]

Figure 12:
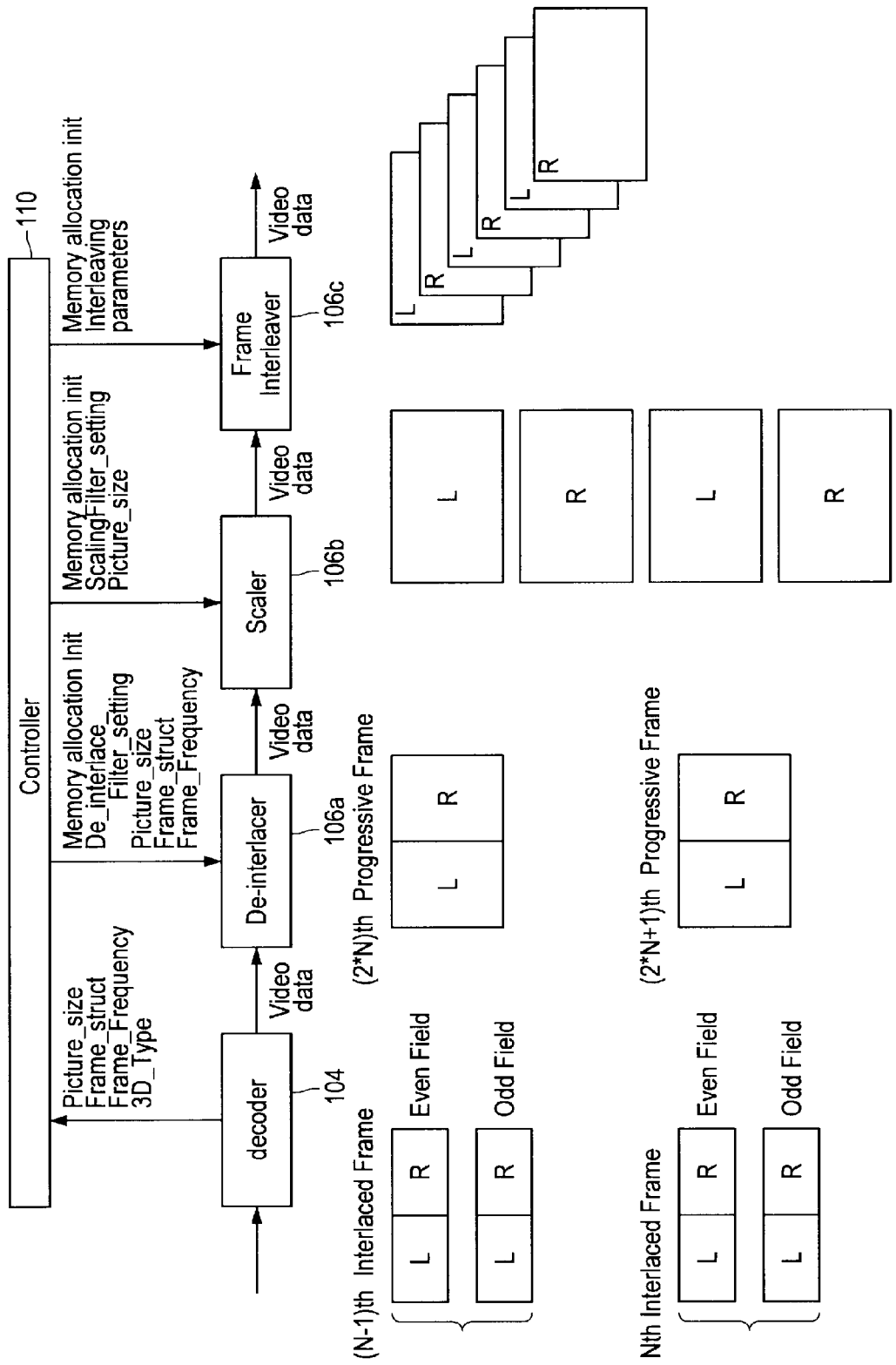
FIG. 12 is a schematic diagram illustrating changes of memory settings.

FIG. 12 is a schematic diagram illustrating changes of memory settings. As shown in the upper part of FIG. 12, a de-interlacer 106a, a scaler 106b, and a frame interleaver 106c are arranged in the subsequent stage of the decoder 104 and the function block is mainly configured by the backend processor 106. The lower part of FIG. 12 shows output from the decoder 104 and each of cases when video data has interlaced frames and progressive frames is shown. For interlaced frames, an (N−1)-th frame and an N-th frame are composed of a frame pair of Even Field and Odd Field and L, R data of one frame is composed of a frame pair. For progressive frames, on the other hand, the number of frames is double that of interlaced frames and a 2*N-th frame and a (2*N+1)-th frame are configured by L, R data being arranged in one frame.

A memory necessary to hold these data is allocated to a memory space by the system control 110. The necessary memory configuration changes depending on 3D_type and the controller initializes memory allocation when 3D_Type is switched. The memory is frequently initialized in timing dependent on the operating system and the timing necessary for initialization may be in the range of 10 ms to several tens of ms. On the other hand, filter switching by the de-interlacer 106a or the scaler 106b is performed after normal processing being temporarily stopped.

In view of these factors, a switching preparation period ranging from a plurality of video frames or a plurality of video vertical periods to several seconds for 3D_Type switching is necessary. Thus, it is necessary to transmit information about a time difference up to switching timing of 3D_Type from the transmitting side to the receiving side to cause the display panel to display new 3D_Type after switching from the initial video frame onward.

In the present embodiment, if switching occurs as described above, the switching timing is indicated in advance by the frame count-down value before the switching timing. Thus, by making preparations for memory initialization in advance, the receiver 100 can cause the display panel to display new 3D_Type after switching from the video frame immediately after switching onward.

[(8) Operation of Conversion Prohibition Based on the Conversion Prohibition Flag]

Next, the operation of conversion prohibition based on the conversion prohibition flag will be described. As described in FIG. 3, identification information added to the stream syntax of the codec layer of each frame contains the conversion prohibition flag (Prohibit_Convert_flag). The conversion prohibition flag is set to "1" when content transmitted from the transmitting side should be prohibited from being converted according to the intention of the transmitting side. On the other hand, the conversion is permitted according to the intention of the transmitting side, the conversion prohibition flag is set to "0".

Like a case when, for example, the transmitted content is premium 3D video, content that is not assumed to be displayed as 2D video on the transmitting side may be delivered. In such a case, conversion to 2D by the receiver 100 is prohibited by setting the conversion prohibition flag to "1" on the transmitting side. Similarly, if transmitted content is 2D video and conversion to 3D video is not assumed on the transmitting side, conversion to 3D by the receiver 100 is prohibited by setting the conversion prohibition flag to "1" on the transmitting side.

Figure 19:
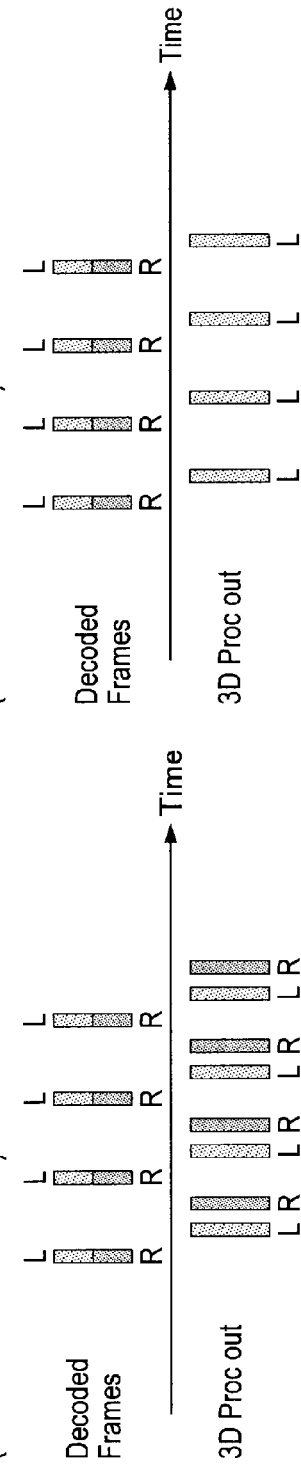
FIG. 19 is a schematic diagram showing the operation of the receiver based on the conversion prohibition flag.

FIGS. 18, 19, and 20 are schematic diagrams showing the operation of the receiver 100 based on the conversion prohibition flag. FIGS. 18 and 19 show a case when content transmitted from the transmitting side is 3D video, FIG. 18 shows a case of the frame sequential mode, and FIG. 19 is a case of the side-by-side mode. FIG. 20 shows a case when the transmitted content is 2D video.

In the field sequential mode shown in FIG. 18, like in FIG. 8, a frame of the left-eye image L and a frame of the right-eye image R are alternately output frame sequentially from the decoder 106. If, as shown in FIG. 18, the conversion prohibition flag is "0" ([i]Prohibit_Convert_flag=0), the conversion is permitted and the receiver 100 can normally 3D-play back the received content (normal 3D playback). If the conversion prohibition flag is "0", the receiver 100 can also convert 3D video into 2D video to play back 2D converted video (2D convert playback). For normal 3D playback, the backend processor 106 performs predetermined 3D processing on data (Decoded Frames shown in FIG. 18) output from the decoder 104 and outputs as data of 3D Proc out shown in FIG. 18. In this case, the backend processor 106 can output without performing scaling in the space direction or time direction. For 2D convert playback, only the left-eye image L is extracted from data (Decoded Frames shown in FIG. 18) output from the decoder 104 and output by the backend processor 106. Thus, 3D video can be converted into 2D video with only the left-eye image L and then played back. Incidentally, for 2D convert playback, only frames of the right-eye image R may be extracted to convert 3D video into 2D video with only the right-eye image R for playback.

On the other hand, if the conversion prohibition flag is "1" ([ii]Prohibit_Convert_flag=1) in FIG. 18, the conversion is prohibited and the receiver 100 can normally 3D-play back the received content (normal 3D playback), but is not permitted to convert the 3D video into 2D video. Thus, the conversion from 3D video into 2D video does not function in the receiver 100. 3D playback is the same as when the conversion prohibition flag is "0".

In the side-by-side mode shown in FIG. 19, image data in which the left-eye image L and the right-eye image R are put together in one frame is output from the decoder 104. If, as shown in FIG. 19, the conversion prohibition flag is "0" ([i]Prohibit_Convert_flag=0), the conversion is permitted and the receiver 100 can normally 3D-play back the received content (normal 3D playback). If the conversion prohibition flag is "0", the receiver 100 can also convert 3D video into 2D video to play back 2D converted video (2D convert playback). For normal 3D playback, scaling processing (interpolation processing) is horizontally performed on left and right images of data (Decoded Frames shown in FIG. 19) output from the decoder 104 by the backend processor 106 and the left-eye image L and the right-eye image R are alternately output for each frame chronologically as 3D Proc out data shown in FIG. 19. For 2D convert playback, scaling processing is performed on only the left-eye image L of data (Decoded Frames shown in FIG. 19) output from the decoder 104 by the backend processor 106 and only the left-eye image L is output in each frame. Thus, 3D video can be converted into 2D video with only the left-eye image L and then played back. Incidentally, for 2D convert playback, scaling processing may be horizontally performed only on the right-eye image R to convert 3D video into 2D video with only the right-eye image R for playback.

On the other hand, if the conversion prohibition flag is "1" ([ii]Prohibit_Convert_flag=1) in FIG. 19, the conversion is prohibited and the receiver 100 can normally 3D-play back the received content (normal 3D playback), but is not permitted to convert the 3D video into 2D video. Thus, the conversion from 3D video into 2D video does not function in the receiver 100. 3D playback is the same as when the conversion prohibition flag is "0".

If, as shown in FIG. 20, the transmitted content is 2D video and the conversion prohibition flag is "0" ([i]Prohibit_Convert_flag=0), the conversion is permitted and the receiver 100 can normally 2D-play back the received content (normal 2D playback). If the conversion prohibition flag is "0", the receiver 100 can also convert 2D video into 3D video to play back 3D converted video (3D convert playback). For normal 2D playback, 3D processing is not performed on data for the left-eye image L (Decoded Frames shown in FIG. 20) output from the decoder 104 by the backend processor 106 and the data is output as 2D data frames. Accordingly, 2D video with the left-eye image L can be displayed. If 2D video with data of the right-eye image R is transmitted from the transmitting side, 2D video with the right-eye image R can be displayed.

When 2D Convert playback is performed in FIG. 20, processing to shift video by the parallax is performed on data (Decoded Frames shown in FIG. 20) of the left-eye image L output from the decoder 104 by the backend processor 106. With this processing, the right-eye image R to be paired with the original left-eye image L is generated so that the left-eye image L and the right-eye image R are alternately output. When processing to shift the left-eye image L by the parallax is performed, more realistic 3D video can be generated by making the amount of parallax different from object to object contained in the left-eye image L. In this case, various methods can be used to detect objects such as a method of detecting contour edges and a method of detecting difference of brightness or contrast.

On the other hand, if the conversion prohibition flag is "1" ([ii]Prohibit_Convert_flag=1) in FIG. 20, the conversion is prohibited and the receiver 100 can normally 2D-play back the received content (normal 2D playback), but is not permitted to convert the 2D video into 3D video. Thus, the conversion from 2D video into 3D video does not function in the receiver 100. 2D playback is the same as when the conversion prohibition flag is "0".

[(8) Configuration Example of the Transmitter]

Figure 13:
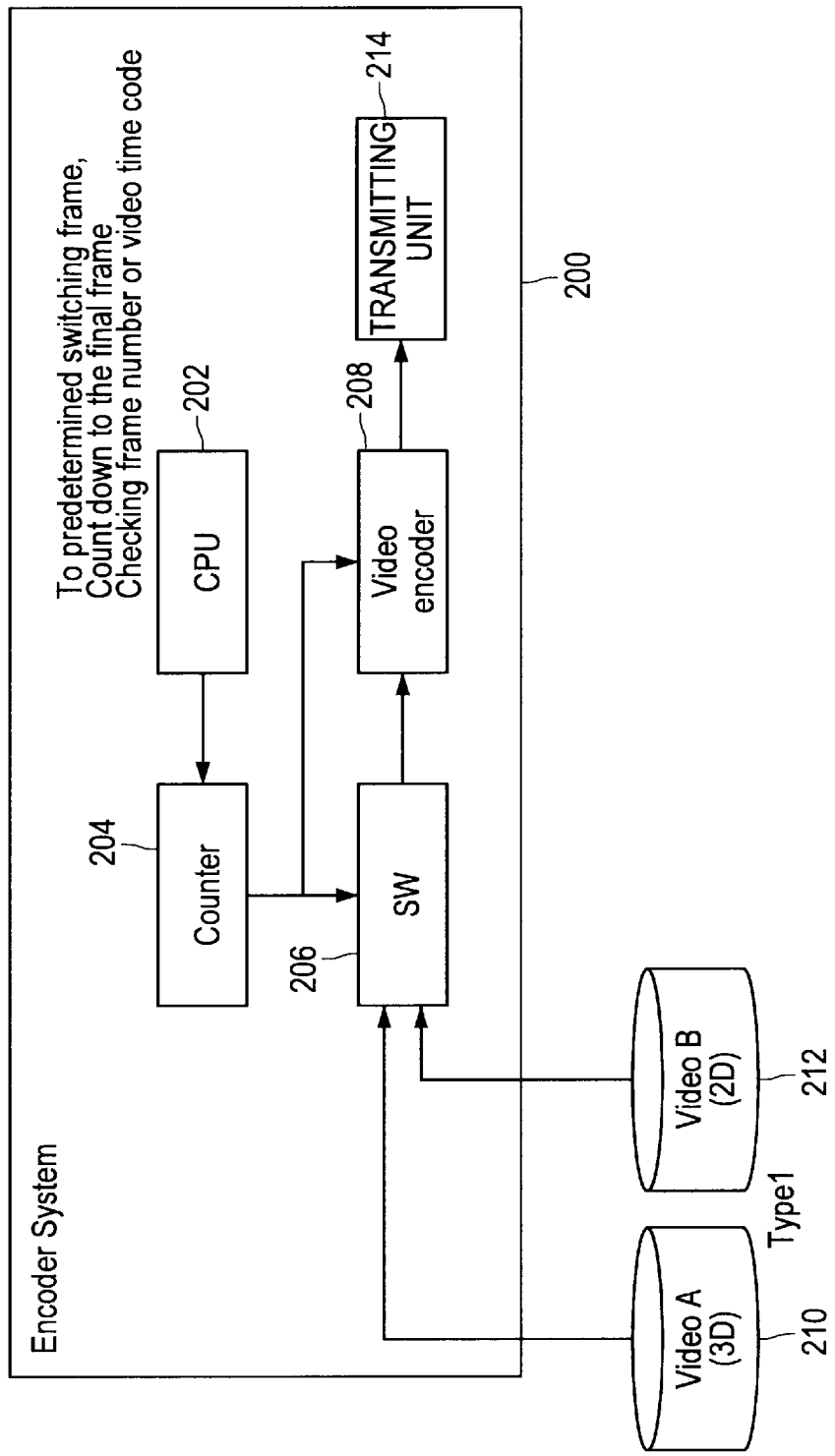
FIG. 13 is a schematic diagram showing the configuration of a transmitter according to the present embodiment.

FIG. 13 is a schematic diagram showing the configuration of a transmitter 200 according to the present embodiment. The transmitter 200 is used to encode and transmit 3D video or 2D video to the receiver 100 via a wire or wireless transmission path.

As shown in FIG. 13, the transmitter 200 includes a CPU 202, a counter 204, a switch 206, and a video encoder 208. A database 210 and a database 212 are connected to the switch 206. The database 210 and the database 212 may be configured integrally with the transmitter 200 or separately. The configuration shown in FIG. 13 can be set up by a circuit (hardware) or a CPU (central processing unit) and a program (software) to cause the circuit or CPU to function. In this case, the program can be stored in a memory included in the receiver 100 or an external storage medium.

The database 210 has data of 3D video A stored therein. The database 212 has data of 2D video B stored therein. Data of the video A stored in the database 210 and data of the video B stored in the database 212 are transmitted to the switch 206. The switch 206 selects one of the video A and the video B and sends the selected video to the video encoder 208. The switch 206 sends one of the video A and the video B to the video encoder 208 in accordance with the count number of frames by the counter 204.

The counter 204 counts the number of frames of video data transmitted to the video encoder 208 based on instructions from the CPU 202 and sends the count number up to switching to the switch 206. If, for example, the 3D video A is data of the main portion of a program and the 2D video B is commercial data, the CPU 202 sends the count number of frames corresponding to the time offset up to switching from the video A of the main portion of the program to the video B of the commercial to the switch 206.

Based on the count number sent from the counter 204, the switch 206 switches the video sent to the video encoder 208 in timing in which switching occurs. Accordingly, the video can mutually be switched between the video A of the main portion of a program and the video B of commercials.

The video encoder 208 encodes data of the video A or the video B sent from the switch 206 as a bit stream of MPEG-4 AVC, MPEG-2 Video, VC-1, MPEG4 Visua or the like to transmit the data to the receiver 100.

The counter 204 sends the counter number up to switching to the video encoder 208. The video encoder 208 adds the count number sent from the counter 204 to the stream syntax of the codec layer of each encoded frame as the frame countdown value. Based on instructions from the CPU 202, the video encoder 208 adds various kinds of data described with reference to FIGS. 3 to 7 to data of the video A or the video B. The bit stream encoded by the video encoder 208 is transmitted from a transmitting unit 214 to the receiver 100.

According to the above configuration, the transmitter 200 can switch the 3D video A and the 2D video B based on instructions of the CPU 202. The transmitter 200 can add the count-down value indicating the number of frames up to switching to video data based on instructions of the CPU 202. The transmitter 200 can also add various kinds of information in FIGS. 3 to 7 to video data. Therefore, based on these information added by the transmitter 200, the receiver 100 side can perform processing before and after switching and make preparations for various kinds of processing concerning switching in advance.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

100 Receiver
104 Decoder
106 Backend processor
200 Transmitter
202 CPU
208 Video encoder
206 Framing unit

The invention claimed is:

1. A receiver, comprising:
a decode processing circuit that decodes a video signal received from outside;
a circuit that acquires identification information including a format concerning 2D or 3D of video from a layer corresponding to each frame of the video signal; and
a processing circuit that performs processing for an image display by the video signal based on the identification information,
the identification information having offset information indicating a timing when switching of the 3D format of the video occurs or a timing when switching of the 3D video and the 2D video occurs,
the processing performed by the processing circuit includes switching processing for switching of the 3D format or of the 3D video and the 2D video, and
the processing circuit starts the switching processing before the switching occurs based on the offset information.

2. The receiver according to claim 1,
wherein the processing circuit performs spatial or temporal scaling of video data by the video data based on the identification information and, when the format of the video is switched, switches parameters for the scaling adjusting to switching timing.

3. A receiver, comprising:
a decode processing circuit that decodes a video signal received from outside;
a circuit that acquires identification information including a format concerning 2D or 3D of video from a layer corresponding to each frame of the video signal; and
a processing circuit that performs processing for an image display by the video signal based on the identification information,
wherein processing performed by the processing circuit includes spatial or temporal scaling of video data by the video data based on the identification information and, when the format of the video is switched, switches parameters for the scaling adjusting to switching timing, and
wherein the identification information contains offset information indicating the timing when the switching of the 3D format of the video occurs or the timing when the switching of the 3D video and the 2D video occurs and
the processing circuit starts, based on the offset information, the processing to switch the parameters before the timing when the switching occurs.

4. A receiver, comprising:
a decode processing circuit that decodes a video signal received from outside;
a circuit that acquires identification information including a format concerning 2D or 3D of video from a layer corresponding to each frame of the video signal; and
a processing circuit that performs processing for an image display by the video signal based on the identification information,
wherein processing performed by the processing circuit includes spatial or temporal scaling of video data by the video data based on the identification information and, when the format of the video is switched, switches parameters for the scaling adjusting to switching timing, and
wherein the identification information contains offset information indicating the timing when the switching of the 3D format of the video occurs or the timing when the switching of the 3D video and the 2D video occurs, and
the processing circuit starts, based on the offset information, the processing to switch settings of a temporary buffer to hold the decoded video signal before the timing when the switching occurs.

5. The receiver according to claim 2,
wherein the identification information contains information representing at least one of a side-by-side mode, a top and bottom mode, and a frame sequential mode as the 3D format.

6. A receiver, comprising:
a decode processing circuit that decodes a video signal received from outside;
a circuit that acquires identification information including a format concerning 2D or 3D of video from a layer corresponding to each frame of the video signal; and
a processing circuit that performs processing for an image display by the video signal based on the identification information,
wherein processing performed by the processing circuit includes spatial or temporal scaling of video data by the video data based on the identification information and, when the format of the video is switched, switches parameters for the scaling adjusting to switching timing, and
wherein the identification information contains information indicating whether spatial or temporal phases of two views for a left eye and a right eye according to the 3D format have same phases or different phases.

7. A receiver, comprising:
a decode processing circuit that decodes a video signal received from outside;
a circuit that acquires identification information including a format concerning 2D or 3D of video from a layer corresponding to each frame of the video signal; and a processing circuit that performs processing for an image display by the video signal based on the identification information, wherein processing performed by the processing circuit includes spatial or temporal scaling of video data by the video data based on the identification information and, when the format of the video is switched, switches parameters for the scaling adjusting to switching timing, and wherein the identification information contains a signal indicating that the video signal is changed to the 2D video by copying one of 3D left-right videos to the other.

8. The receiver according to claim 2, wherein the processing circuit performs, as the spatial scaling, the processing to expand the video decoded by the decode processing circuit in a screen vertical direction or a screen horizontal direction.

9. The receiver according to claim 2, wherein the processing circuit performs, as the temporal scaling, copying or interpolation processing of video frames arranged chronologically.

10. The receiver according to claim 1, wherein the identification information contains information to prohibit a conversion of the format of the video.

11. An image display method, comprising:

decoding a video signal received from outside;

acquiring identification information including a format concerning 2D or 3D of video from a layer corresponding to each frame of the video signal; and performing processing for an image display by the video signal based on the identification information, the identification information having offset information indicating a timing when switching of the 3D format of the video occurs or a timing when switching of the 3D video and the 2D video occurs, the processing including switching processing for switching of the 3D format or of the 3D video and the 2D video, in which the switching processing starts before the switching occurs based on the offset information.

12. A non-transitory computer readable medium having stored thereon a program to cause a computer to decode a video signal received from outside;

acquire identification information including a format concerning 2D or 3D of video from a layer corresponding to each frame of the video signal; and perform processing for an image display by the video signal based on the identification signal, the identification information having offset information indicating a timing when switching of the 3D format of the video occurs or a timing when switching of the 3D video and the 2D video occurs, the processing including switching processing for switching of the 3D format or of the 3D video and the 2D video, in which the switching processing starts before the switching occurs based on the offset information.

* * * * *